(12) United States Patent
Yogev et al.

(10) Patent No.: US 9,561,844 B2
(45) Date of Patent: Feb. 7, 2017

(54) SYSTEM AND METHOD FOR AN AIR VEHICLE

(75) Inventors: Itzhak Yogev, Tel-Mond (IL); Michael Shepshelovich, Ganei Tikva (IL); Danny Abramov, Rehovot (IL)

(73) Assignee: Israel Aerospace Industries Ltd., Lod (IL)

( * ) Notice: Subject to any disclaimer, the term of this patent is extended or adjusted under 35 U.S.C. 154(b) by 147 days.

(21) Appl. No.: 13/552,263

(22) Filed: Jul. 18, 2012

(65) Prior Publication Data
US 2013/0020432 A1 Jan. 24, 2013

(30) Foreign Application Priority Data

Jul. 19, 2011 (IL) .......................................... 214159

(51) Int. Cl.
*B64C 9/12* (2006.01)
*B64C 9/32* (2006.01)
*B64C 15/02* (2006.01)

(52) U.S. Cl.
CPC ................ *B64C 9/12* (2013.01); *B64C 9/323* (2013.01); *B64C 9/326* (2013.01); *B64C 15/02* (2013.01); *Y02T 50/32* (2013.01)

(58) Field of Classification Search
CPC ............ B64C 9/12; B64C 9/323; B64C 9/326; B64C 15/02
USPC ................................ 244/87, 88, 91, 184, 198
See application file for complete search history.

(56) References Cited

U.S. PATENT DOCUMENTS

| | | | | |
|---|---|---|---|---|
| 2,480,040 A | * | 8/1949 | Mitchell | .......................... 244/87 |
| 3,912,202 A | * | 10/1975 | Jenkins | ................... F02K 1/002 |
| | | | | 244/12.5 |
| 6,352,223 B1 | * | 3/2002 | Larramendy | ................. 244/177 |
| 2006/0237580 A1 | * | 10/2006 | Cuccias | ..................... B64C 3/16 |
| | | | | 244/1 N |
| 2006/0284022 A1 | | 12/2006 | Harrigan et al. | |

OTHER PUBLICATIONS

"Aircraft Yaw Motion", NASA Glenn Research Center, http://www.grc.nasa.gov/WWW/k-12/airplane/yaw.html, pp. 1-2.*

* cited by examiner

*Primary Examiner* — Nicholas McFall
(74) *Attorney, Agent, or Firm* — Dorsey & Whitney LLP

(57) ABSTRACT

A method for providing a controllable side force to an air vehicle having a vertical stabilizer arrangement includes (a) selectively causing the vertical stabilizer arrangement to generate a first side force in a first side direction to provide the controllable side force, the first side force inducing a corresponding first yaw moment in a first yaw direction; and (b) selectively providing to the air vehicle a second yaw moment in a second yaw direction, the second yaw moment being induced by a force component of an auxiliary force applied to the air vehicle, the force component being in a force direction that is non-parallel with respect to the first side direction and the force component being spaced from a center of gravity of the air vehicle; wherein the second yaw direction is opposed to the first yaw direction. Also disclosed is a corresponding auxiliary yaw generating system.

26 Claims, 16 Drawing Sheets

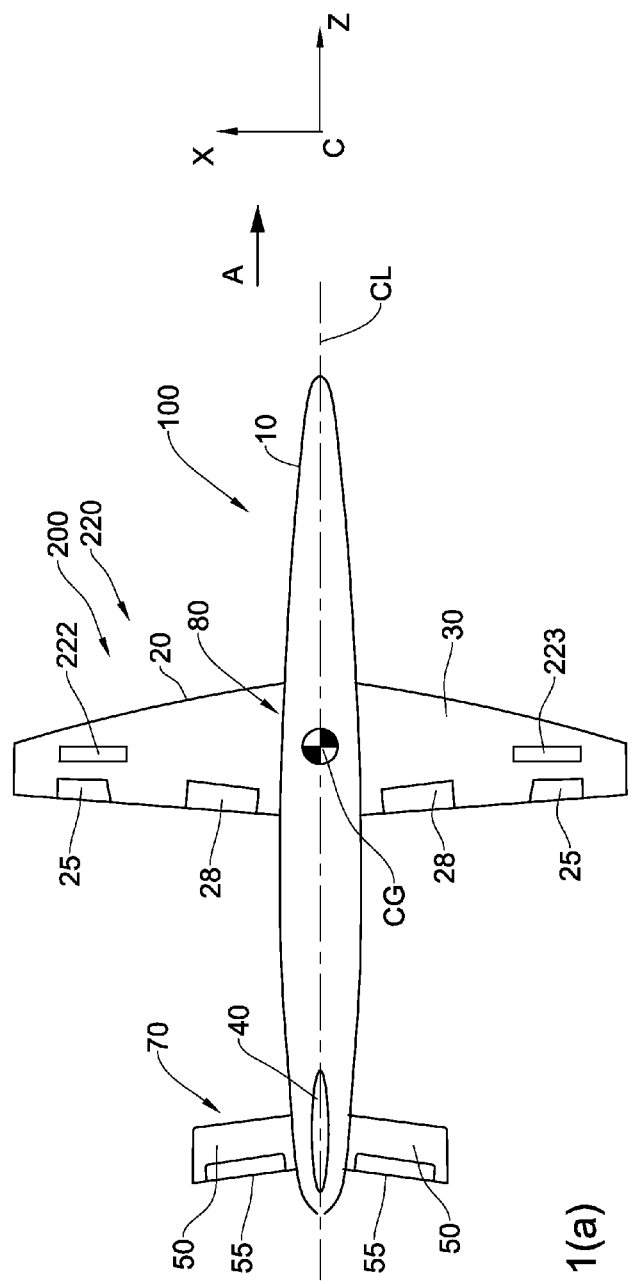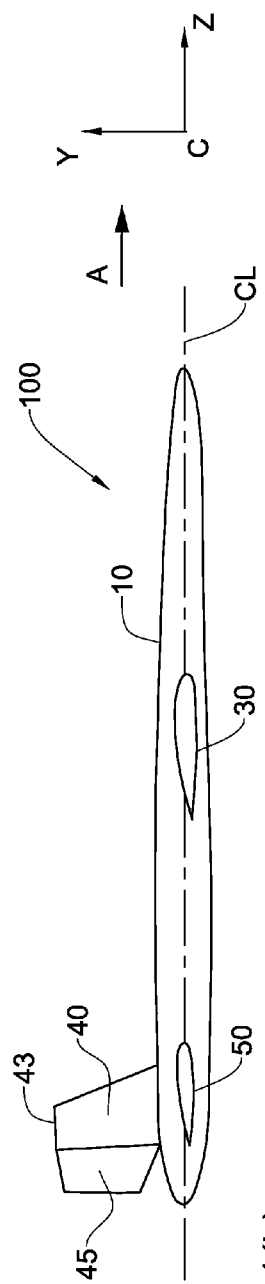

SYSTEM AND METHOD FOR AN AIR VEHICLE

CROSS-REFERENCE TO RELATED APPLICATIONS

This application claims priority to Israel Patent Application No. 214159 filed on 19 Jul. 2011, the contents of which are incorporated herein, in their entirety, by this reference.

TECHNICAL FIELD

Embodiments of the invention relate to air vehicles, in particular to systems and methods for controlling air vehicles.

BACKGROUND

Side force for an air vehicle is conventionally produced when flying the air vehicle in sideslipping flight, at a sideslip angle of attack β, often referred to simply as sideslip angle β. Sideslip angle β relates to a yaw rotation of the air vehicle centerline from the relative wind direction, and is conventionally regarded as "positive" when the relative wind is coming from the starboard side (right of the nose) of the air vehicle, and "negative" when the relative wind is coming from the port side (left of the nose) of the air vehicle. Side force for an air vehicle is also conventionally produced when deflecting a rudder of the air vehicle. Also conventionally, rudder deflection ($\delta_r$) is considered "positive" when the rudder is deflected towards the port side (left of the vertical tail) of the air vehicle, and "negative" when the rudder is deflected towards the starboard side (right of the vertical tail) of the air vehicle.

The main contributors to the side force at sideslip are the fuselage (or body) and the vertical tail of the air vehicle. These two components produce yawing moments of opposite signs, defining the level of directional stability of the air vehicle configuration. The resulting yawing moment when the air vehicle is conventionally trimmed at sideslip flight by rudder deflections, produces a significant loss of initial untrimmed side force.

For example, referring to FIG. 14(a), in such sideslipping flight, the air vehicle is illustrated at a positive sideslip angle β, and the fuselage and vertical tail together generate a net positive side force in the port direction. The vertical tail also induces an accompanying net clockwise yaw moment which if untrimmed would tend to stabilize the air vehicle and align the air vehicle centerline with the relative wind direction, thereby diminishing the sideslip angle β and net side force, eventually both to zero. Conventionally, the air vehicle may be trimmed to maintain the sideslip angle β by inducing a counter-clockwise yaw moment, and this is conventionally done by providing a positive rudder deflection as illustrated in FIG. 14(b). However, this also results in the original untrimmed net side force being significantly reduced.

Air vehicle configurations having a tandem arrangement of a forward vertical surface as well as an aft vertical surface (on longitudinally opposite sides of the center of gravity) can theoretically help trim the undesired yawing moments while producing increased values of side force in the desired direction, and may be capable of producing trimmed side force even at zero sideslip angle of attack, using simultaneous deflections of forward and aft rudders. However such an air vehicle configuration inherently has reduced directional stability as compared to a similar air vehicle configuration in which the forward vertical surface is missing, or, alternatively, requires a significantly larger aft vertical surface than forward vertical surface for maintaining directional stability.

SUMMARY

According to an aspect of the invention there is provided a method for providing a controllable side force to an air vehicle having a vertical stabilizer arrangement, comprising:

(A) selectively causing said vertical stabilizer arrangement to generate a first side force in a first side direction to provide said controllable side force, said first side force inducing a corresponding first yaw moment in a first yaw direction; and (B) selectively providing to the air vehicle a second yaw moment in a second yaw direction, said second yaw moment being induced by a force component of an auxiliary force applied to said air vehicle, said force component being in a force direction that is non-parallel with respect to said first side direction and said force component being spaced from a center of gravity of the air vehicle; wherein said second yaw direction is opposed to said first yaw direction.

The aforesaid method can further comprise one or more of at least the following steps/features (a) to (u), in any desired combination or permutation:

(a) Wherein said first yaw moment is of substantially the same magnitude as said second yaw moment.

(b) Wherein in step (A) comprises causing the air vehicle to adopt a non-zero sideslip angle to the relative wind direction, and providing a zero rudder deflection for said vertical stabilizer arrangement; or, wherein in step (A) comprises causing the air vehicle to adopt a positive sideslip angle to the relative wind direction, and providing a negative rudder deflection for said vertical stabilizer arrangement; or, wherein in step (A) comprises causing the air vehicle to adopt a negative sideslip angle to the relative wind direction, and providing a positive rudder deflection for said vertical stabilizer arrangement; or, wherein in step (A) comprises causing the air vehicle to adopt a zero sideslip angle to the relative wind direction, and providing one of a negative rudder deflection and a positive rudder deflection for said vertical stabilizer arrangement.

(c) Wherein said second yaw moment is induced independently of generating a second side force in a second side direction, wherein said second side direction is opposed to said first side direction.

(d) Wherein said second yaw moment is induced independently of operating a pitch control surface of the air vehicle.

(e) Wherein said second yaw moment is induced independently of operating said vertical stabilizer arrangement.

(f) Wherein said force component comprises a differential force generated between a port side and a starboard side of the air vehicle.

(g) The differential force can be orthogonal to a yaw axis of the air vehicle and substantially orthogonal to said first side force direction.

(h) Said differential force can comprise a differential drag; the air vehicle can comprise a drag inducing system operable for selectively providing said differential drag between said port side and said starboard side, step (B) comprising operating said drag inducing system to generate an appropriate said differential drag capable of inducing said second yaw moment in said second yaw direction.

(i) The air vehicle can comprise a port wing and a starboard wing, and wherein said drag inducing system is operable for selectively providing said differential drag between said port wing and said starboard wing;
(j) The method can comprise operating said drag inducing system wherein to cause one or another of said port wing and said starboard wing to increase drag relative to the other one of said port wing and said starboard wing to thereby generate said differential drag.
(k) The drag inducing system can comprise at least one of a spoiler and an air brake device on each said wing, and said increased drag is provided by at least one of:
  selectively deploying at least one of said spoiler and said air brake device on one of said port wing and said starboard wing, while selectively refraining from deploying the respective at least one of said spoiler and said air brake device on the other one of said port wing and said starboard wing; and
  selectively deploying at least one of said spoiler and said air brake device on said port wing to provide a port drag, and selectively deploying the respective at least one of said spoiler and said air brake device on said starboard wing to provide a starboard drag, wherein said port drag is of a different magnitude to said starboard drag, and wherein a difference between said port drag and said starboard drag provides said drag differential.
(l) Said drag inducing system can comprise a respective said spoiler of each one of said port wing and said starboard wing, and wherein said spoiler is configured for enabling providing thereby said second yaw moment having a magnitude greater than a magnitude of said first yaw moment, wherein said first yaw moment corresponds to a zero rudder angle of said vertical stabilizer arrangement.
(m) The air vehicle can comprise a port fuselage portion and a starboard fuselage portion, and wherein said drag inducing system is operable for selectively providing said differential drag between said port fuselage portion and said starboard fuselage portion.
(n) The method can comprise operating said drag inducing system wherein to cause one or another of said port fuselage portion and said starboard fuselage portion to increase drag relative to the other one of said port fuselage portion and said starboard fuselage portion to thereby generate said differential drag.
(o) The drag inducing system can comprise at least one brake device on each one of said port fuselage portion and said starboard fuselage portion, and said increased drag is provided by at least one of:
  selectively deploying said at least one air brake device on one of said port of said port fuselage portion and said starboard fuselage portion, while selectively refraining from deploying the respective said at least one air brake device on the other one of said port fuselage portion and said starboard fuselage portion; and
  selectively deploying at least one said air brake device on said port fuselage portion to provide a port drag, and selectively deploying the respective at least one said air brake device on said starboard fuselage portion to provide a starboard drag, wherein said port drag is of a different magnitude to said starboard drag, and wherein a difference between said port drag and said starboard drag provides said drag differential.
(p) The differential force can comprise a differential thrust.
(q) The air vehicle can comprise a propulsion system operable for selectively providing said differential thrust between said port side and said starboard side, step (B) comprising operating said propulsion system to generate an appropriate said differential thrust capable of inducing said second yaw moment in said second yaw direction.
(r) The air vehicle can comprise a port wing and a starboard wing, and wherein said propulsion system is operable for selectively providing said differential thrust between said port wing and said starboard wing.
(s) The propulsion system can comprise at least one propulsion unit on each said wing, and said differential thrust is provided by at least one of:
  inducing a reverse thrust on one of said port wing and said starboard wing, while maintaining thrust of the other one of said port wing and said starboard wing; and
  selectively decreasing or increasing thrust generated by the respective said propulsion unit on said port wing to provide a port thrust, and selectively increasing or decreasing thrust generated by the respective said propulsion unit on said starboard wing to provide a starboard thrust, wherein said port thrust is of a different magnitude to said starboard thrust, and wherein a difference between said port thrust and said starboard thrust provides said thrust differential.
(t) The air vehicle can comprise at least one propulsion unit on a port fuselage portion and at least one propulsion unit on a starboard fuselage portion, and wherein said propulsion system is operable for selectively providing said differential thrust between said port fuselage portion and said starboard fuselage portion.
(u) Said differential thrust can be provided by at least one of:
  selectively inducing a reverse thrust on at least one said propulsion unit on said port fuselage portion or on at least one said propulsion unit on said port fuselage portion, while maintaining thrust on the other one of said port fuselage portion and said starboard fuselage portion; and
  selectively decreasing or increasing thrust generated by the respective at least one said propulsion unit on said port fuselage portion to provide a port thrust, and selectively increasing or decreasing thrust generated by the respective at least one said propulsion unit on said fuselage portion to provide a starboard thrust, wherein said port thrust is of a different magnitude to said starboard thrust, and wherein a difference between said port thrust and said starboard thrust provides said thrust differential.

According to another aspect of the invention there is provided an auxiliary yaw generating system for an air vehicle having a vertical stabilizer arrangement, wherein said vertical stabilizer arrangement is configured to generate a first side force in a first side direction, and the first side force inducing a corresponding first yaw moment in a first yaw direction:
  said auxiliary yaw generating system being configured for selectively providing to the air vehicle a second yaw moment in a second yaw direction, said second yaw moment being induced by a force component of an auxiliary force applied to said air vehicle by means of said auxiliary yaw generating system, said force component being in a force direction that is non-parallel with respect to said first side direction and said force component being spaced from a center of gravity of the air vehicle; wherein said second yaw direction is opposed to said first yaw direction.

The aforesaid auxiliary yaw generating system can further comprise one or more of at least the following features, in any desired combination or permutation:

Said auxiliary yaw generating system is configured for generating said first yaw moment having substantially the same magnitude as said second yaw moment.

Said auxiliary yaw generating system is configured for inducing said second yaw moment independently of generating a second side force in a second side direction, wherein said second side direction is opposed to said first side direction.

Said auxiliary yaw generating system is configured for inducing said second yaw moment independently of operating a pitch control surface of the air vehicle.

Said auxiliary yaw generating system is configured for inducing said second yaw moment independently of operating the vertical stabilizer arrangement.

Said auxiliary yaw generating system is configured for generating said force component, wherein said force component comprises a differential force generated between a port side and a starboard side of the air vehicle.

Said differential force is orthogonal to a yaw axis of the air vehicle and substantially orthogonal to said first side force direction.

Said differential force comprises a differential drag.

The auxiliary yaw generating system comprises a drag inducing system operable for selectively providing said differential drag between said port side and said starboard side, wherein to induce said second yaw moment in said second yaw direction.

Wherein the air vehicle comprises a port wing and a starboard wing, and wherein said drag inducing system is operable for selectively providing said differential drag between said port wing and said starboard wing.

Said drag inducing system comprises at least one of a spoiler and an air brake device on each one of the port wing and the starboard wing, and said drag inducing system is configured for at least one of:
 selectively deploying at least one of said spoiler and said air brake device on one of said port wing and said starboard wing, while avoiding deploying the respective at least one of said spoiler and said air brake device on the other one of the port wing and the starboard wing; and
 selectively deploying at least one of said spoiler and said air brake device on said port wing to provide a port drag, and for deploying the respective at least one of said spoiler and said air brake device on said starboard wing to provide a starboard drag, wherein said port drag is of a different magnitude to said starboard drag, and wherein a difference between said port drag and said starboard drag provides said drag differential.

Said drag inducing system comprises a respective said spoiler on each one of the port wing and the starboard wing, and wherein said spoiler is configured for enabling providing thereby said second yaw moment having a magnitude greater than a magnitude of said first yaw moment, wherein said first yaw moment corresponds to a zero rudder angle of said vertical stabilizer arrangement.

The air vehicle comprises a port fuselage portion and a starboard fuselage portion, and wherein said drag inducing system is configured for selectively providing said differential drag between said port fuselage portion and said starboard fuselage portion.

Said drag inducing system comprises at least one brake device on each one of said port fuselage portion and said starboard fuselage portion, and said drag inducing system is configured for at least one of:
 selectively deploying said at least one air brake device on one of said port of said port fuselage portion and said starboard fuselage portion, while selectively refraining from deploying the respective said at least one air brake device on the other one of said port fuselage portion and said starboard fuselage portion; and
 selectively deploying at least one said air brake device on said port fuselage portion to provide a port drag, and selectively deploying the respective at least one said air brake device on said starboard fuselage portion to provide a starboard drag, wherein said port drag is of a different magnitude to said starboard drag, and wherein a difference between said port drag and said starboard drag provides said drag differential.

Said differential force comprises a differential thrust.

The air vehicle comprises a propulsion system configured for selectively providing said differential thrust between said port side and said starboard side, to generate an appropriate said differential thrust capable of inducing said second yaw moment in said second yaw direction.

The air vehicle comprises a port wing and a starboard wing, and wherein said propulsion system is configured for selectively providing said differential thrust between said port wing and said starboard wing.

The propulsion system comprises at least one propulsion unit on each one of the port wing, and the starboard wing and said propulsion system is configured for providing said differential thrust by at least one of:
 inducing a reverse thrust on one of the port wing and the starboard wing, while maintaining thrust of the other one of the port wing and the starboard wing; and
 selectively decreasing or increasing thrust generated by the respective said propulsion unit on the port wing to provide a port thrust, and selectively increasing or decreasing thrust generated by the respective said propulsion unit on the starboard wing to provide a starboard thrust, wherein said port thrust is of a different magnitude to said starboard thrust, and wherein a difference between said port thrust and said starboard thrust provides said thrust differential.

The air vehicle comprises at least one propulsion unit on a port fuselage portion and at least one propulsion unit on a starboard fuselage portion, and wherein said propulsion system is configured for selectively providing said differential thrust between said port fuselage portion and said starboard fuselage portion.

Said propulsion system is configured for providing differential thrust by at least one of:
 inducing a reverse thrust on at least one said propulsion unit on the port fuselage portion or on at least one said propulsion unit on the port fuselage portion, while maintaining thrust on the other one of the port fuselage portion and the starboard fuselage portion; and selectively decreasing or increasing thrust generated by the respective at least one said propulsion unit on the port fuselage portion to provide a port thrust, and selectively increasing or decreasing thrust generated by the respective at least one said propulsion unit on the fuselage portion to provide a starboard thrust, wherein said port thrust is of a different magnitude to said starboard thrust, and wherein a difference between said port thrust and said starboard thrust provides said thrust differential.

According to this aspect of the invention there is also provided an air vehicle having a vertical stabilizer arrangement and the auxiliary yaw generating system as defined above optionally including at least one or more of the aforementioned features, in any desired combination or permutation.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1(a) is a top view of an air vehicle according to a first embodiment of the invention, and FIG. 1(b) is a side view of the embodiment of FIG. 1(a).

DETAILED DESCRIPTION OF EMBODIMENTS

Figure 2A:
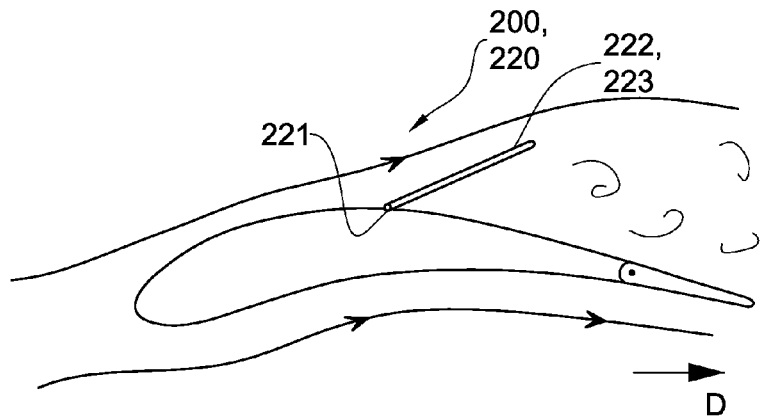
FIG. 2(a) is a side view of a first embodiment of an auxiliary yaw moment generating arrangement comprising an upper surface spoiler.

Referring to FIGS. 1(a) and 1(b), an air vehicle according to a first embodiment of the invention, generally designated 100, comprises a generally conventional layout, including a body or fuselage 10 defining an air vehicle centerline CL, an aerodynamic lift generating arrangement 80 configured for generating aerodynamic lift and for providing control moments in roll during flight, and a stability and control arrangement 70 configured for providing stability and control moments at least in pitch and yaw during flight.

The aerodynamic lift generating arrangement 80 comprises a fixed-wing main wing arrangement including a port wing 20 and a starboard wing 30. The stability and control arrangement 70 comprises a vertical stabilizer 40, and horizontal stabilizers 50. It is to be understood that in alternative variations of this embodiment, the aerodynamic lift generating arrangement and/or the stability and control arrangement may differ from the above. For example, the air vehicle may instead comprise a blended wing body (BWB) configuration, or a flying wing configuration (for example without a fuselage per se), or a lifting body configuration (for example without main wings per se), and/or the air vehicle may comprise a plurality of canards and/or a plurality of vertical stabilizers (for example wing mounted, boom mounted, tailplane mounted, and so on), or comprise any suitable empennage (for example V-shaped tail, inverted-V tail, Pelikan tail, cruciform tail, T-tail, and so on).

The air vehicle 100 further comprises a propulsion system (not shown) for propelling the air vehicle in a forward direction A, and the propulsion system may comprise one or more suitable propulsion units, including, for example, one or more of: a turbofan, turboprop, turbojet, piston engine, rocket engine or indeed any other suitable propulsion unit, as in known or may be conceived in the art. In alternative variations of this embodiment, the air vehicle 100 comprises such a propulsion system, but is nevertheless also configured for aerodynamic flight in an unpowered manner, for example as a glider, for at least a part of a flight. In alternative variations of this embodiment, the air vehicle does not comprise a propulsion system for propulsion, and is configured, for example, as a glider.

For convenience, an orthogonal axes system C may be defined for the air vehicle 100, the z-axis being parallel to the centerline CL and defines the roll axis of the air vehicle 100, the y-axis defining the yaw axis, and the x-axis defining the pitch axis of the air vehicle 100.

The air vehicle 100 is configured for being operated by an on-board pilot, but may be additionally or alternatively operated by a suitable on-board controller (not shown), for example an autopilot, or a computer, and/or remotely via a suitable remote controller (human or computerized) and suitable communications link. In alternative variations of this embodiment, the air vehicle is unmanned and is operated as a UAV.

The port wing 20 and a starboard wing 30 each have control surfaces in the form of ailerons 25 and optionally flaps 28, which may also be considered part of the stability and control arrangement 70.

The vertical stabilizer 40 comprises fin 43 and a rudder 45, and the horizontal stabilizers 50 each comprise an elevator 55, as part of the stability and control arrangement 70. According to a first aspect of the invention, the vertical stabilizer arrangement of the air vehicle 100 is configured for generating a first side force in a first side direction to provide a controllable side force, the first side force inducing a corresponding first yaw moment in a first yaw direction. Furthermore, according to the first aspect of the invention, the air vehicle 100 further comprises an auxiliary yaw moment generating arrangement, configured for selectively providing to the air vehicle a second yaw moment in a second yaw direction, the second yaw moment being induced by a force component of an auxiliary force applied to said air vehicle, this force component being in a force direction that is non-parallel with respect to the first side direction and the force component being spaced from a center of gravity CG of the air vehicle 100, wherein the second yaw direction is opposed to the first yaw direction.

According to at least some embodiments, the auxiliary yaw moment generating arrangement is configured for selectively providing to the air vehicle the aforesaid second yaw moment by selectively generating a differential drag force between the port wing 20 and the starboard wing 30. While the auxiliary yaw moment generating arrangement is configured for selectively operating independently of the conventional yaw inducing operation of the vertical stabilizer 40 including rudder 45, the auxiliary yaw moment generating arrangement is also optionally configured for selectively operating in a selectively linked manner with the vertical stabilizer 40 and rudder 45 to together provide yaw moments in the same direction, or to together provide yaw moments in mutually opposite directions, as will be further disclosed below.

The auxiliary yaw moment generating arrangement is configured for selectively generating a desired yaw moment while concurrently not generating a side force, or at most while generating a side force that is significantly smaller in magnitude than a corresponding side force that may be generated by the stability and control arrangement 70 when the stability and control arrangement 70 is generating a yaw moment similar in magnitude to the aforesaid desired yaw moment generated by the auxiliary yaw moment generating arrangement.

Referring also to FIG. 2(a), a first embodiment of the auxiliary yaw moment generating arrangement, generally designated with the reference numeral 200 comprises a spoiler arrangement 220, including selectively deployable port spoiler 222 and selectively deployable starboard spoiler 223, mounted to the port wing 20 and the starboard wing 30, respectively.

In this embodiment each spoiler 222, 223, is in the form of a plate that is movably mounted to the upper, suction surface of the respective wing 20, 30, and each spoiler 222, 223 is selectively moveable between a respective retracted or closed position, in which the respective spoiler does not substantially alter the flow over the respective wing surface, to a respective deployed or open position illustrated in FIG. 2(a), in which the spoiler presents a frontal area that interferes with the flow over the suction surface of the respective wing, generating a significant respective drag force. In this embodiment, each spoiler 222, 223, is pivotably mounted to the respective wing 20, 30 about a forward hinge axis 221, so that in the closed position the spoiler is substantially flush with the respective suction surface, and the respective spoiler may be pivoted in a generally upward direction to assume an acute angle, for example, with respect to the respective wing suction surface, thereby spoiling the flow over the wing and generating a drag force. In alternative variations of this embodiment, the spoilers may be reversibly retractable into a slot provided on the suction surface, and/or the spoiler arrangement may comprise additional spoilers mounted with respect to the pressure surface of each wing.

Figure 2B:
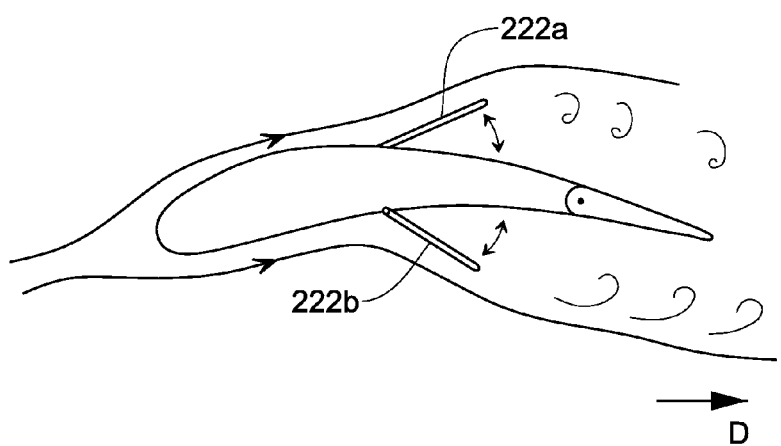
FIG. 2(b) is a side view of a variation of the embodiment of FIG. 2(a) comprising an upper surface spoiler and a lower surface spoiler.

In alternative variations of this embodiment, each spoiler may comprise a plurality of plates, each being movably mounted to the suction surface of the respective wing, and each plate being actuable between a refracted or closed position, and a deployed or open position. In these or other variations of this embodiment, and referring to FIG. 2(b), each spoiler may comprise one or a plurality of plates (indicated at 222a, 222b) movably mounted to each one of the pressure surface (upper surface) and suction surface (lower surface) of the respective wing. In yet other alternative variations of this embodiment, each spoiler may comprise one or a plurality of plates movably mounted to the pressure surface only of the respective wing.

The spoiler arrangement 220 is configured for enabling each one of the port spoiler 222 and starboard spoiler 223 to be separately deployable independently of one another. Further, the spoiler arrangement 220 is configured for enabling each one of the port spoiler 222 and starboard spoiler 223 to be fully deployed to generate a maximum drag force for a given set of conditions such as dynamic pressure, altitude, Mach number and so on, or to be partially deployed to produce a corresponding variable drag force.

The spoiler arrangement 220 is also configured for selectively enabling each one of the port spoiler 222 and starboard spoiler 223 to be deployed by varying amounts to correspondingly generate controllably variable drag forces (for any given set of airflow conditions such as altitude and air speed within predefined operating ranges), for example by selectively and independently varying the deflection angle of the each spoiler to thereby correspondingly vary the frontal cross-sectional area of the respective spoiler.

Thus, the auxiliary yaw moment generating arrangement 200 may be operated so that port spoiler 222 may be partially or fully deployed while starboard spoiler 223 is not deployed, or, both spoilers may be deployed, the port spoiler 222 being more deployed (i.e. and generating more drag) than the starboard spoiler 223, in either case thereby generating a differential drag force D on the port wing 20 with respect to the starboard wing 30. Alternatively, the auxiliary yaw moment generating arrangement 200 may be operated so that the starboard spoiler 223 may be partially or fully deployed while port spoiler 222 is not deployed, or, both spoilers may be deployed, the starboard spoiler 223 being more deployed (and thus generating more drag) than the port spoiler 222, in either case thereby generating a differential drag force D on the starboard wing 30 with respect to the port wing 20. In either case, the respective differential drag force D is generated at a position that is displaced in a direction along the x-axis from the center of gravity CG of the air vehicle 100 by moment arm r.

According to the first aspect of the invention, the air vehicle 100 is configured for selectively providing a desired side force, i.e., in a direction substantially parallel to the pitch axis (x-axis) of the air vehicle, for example to enable the air vehicle to move sideways (sideslip) while concurrently trimming the air vehicle at a corresponding sideslip angle to the relative wind direction.

Figure 3B:
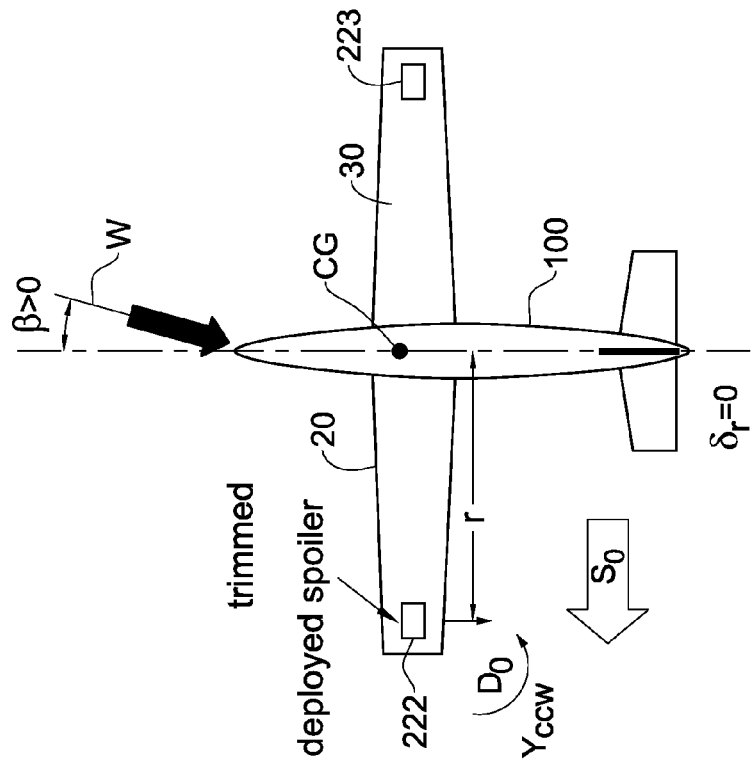
FIGS. 3(a) and 3(b) schematically illustrate operation of the embodiment of FIG. 2(a) untrimmed and trimmed, respectively.
Figure 3A:
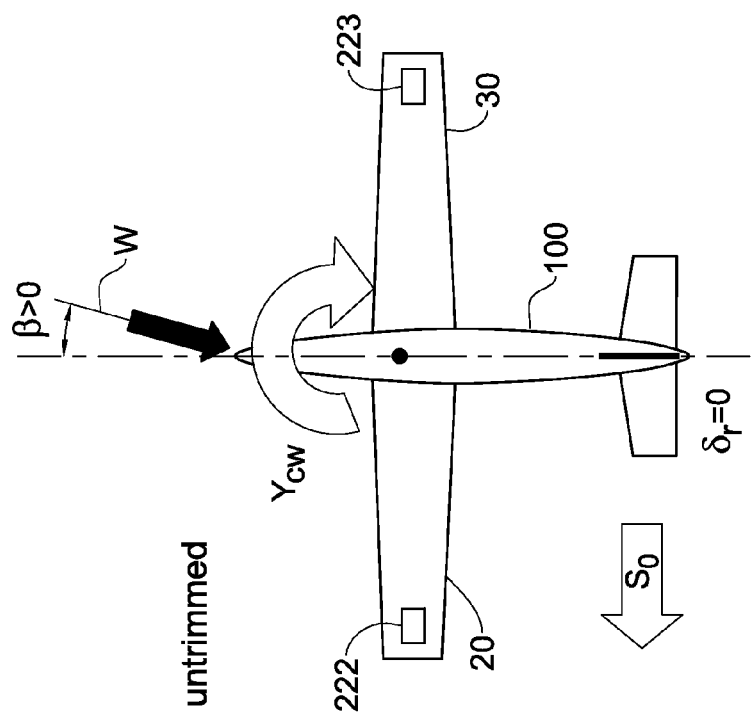

For ease of understanding, reference is made to FIG. 3(*a*), in which the air vehicle 100 is shown at an initial condition in which the air vehicle 100 is at a positive sideslip angle $\beta$ with respect to the relative wind direction W, with the rudder 45 at a rudder deflection $\delta_r$ of zero, and the auxiliary yaw moment generating arrangement 200 inoperational, and thus the spoilers 222, 223 generating no differential drag, and indeed no drag per se.

The air vehicle 100 may initially adopt the position shown in FIG. 3(*a*) for example by inducing a yaw moment, by appropriately deflecting the rudder and subsequently reducing the rudder deflection to zero once the desired sideslip angle $\beta$ is achieved. Alternatively, the auxiliary yaw moment generating arrangement 200 may be operated to provide the initial yaw moment, by providing a differential drag force on the port wing 20 with respect to the starboard wing 30. Alternatively, both the rudder 45 and the auxiliary yaw moment generating arrangement 200 may be operated together and such operation then terminated to concurrently produce yaw moments in the same direction, the summation providing the desired initial untrimmed yaw moment.

Figure 14B:
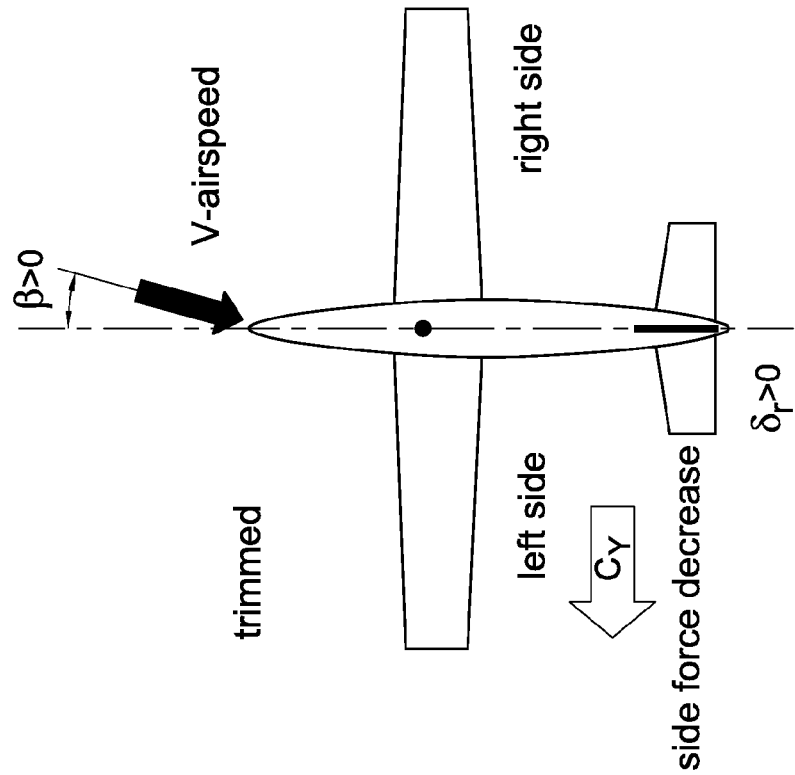
FIGS. 14(a) and 14(b) schematically illustrate conventional operation of an air vehicle, untrimmed and trimmed, respectively.

In a similar manner to that with the convention configuration of FIGS. 14(*a*) and 14(*b*), a side force $S_0$ is generated and a stabilizing net clockwise yaw moment $Y_{cw}$ is also generated in the arrangement illustrated in FIG. 3(*a*), tending to yaw the air vehicle 100, if untrimmed, in a clockwise direction to once again align with the relative wind direction W. According to this aspect of the invention, the auxiliary yaw moment generating arrangement 200 is operated to provide the required compensatory yaw trim, thereby avoiding or minimizing diminishing the original side force $S_0$ generated by the air vehicle 100. Thus, and referring to FIG. 3(*b*), the auxiliary yaw moment generating arrangement 200 is operated to provide a differential drag force $D_0$ on the port wing 20 with respect to the starboard wing 30, by deploying spoiler 222 (or alternatively by deploying spoiler 222 more than spoiler 223), and coupled with the corresponding moment arm r about the center of gravity CG of the air vehicle 100 the differential drag $D_0$ produces a counter clockwise yawing moment $Y_{ccw}$. By providing the appropriate level of differential drag $D_0$ via selective operation of the auxiliary yaw moment generating arrangement 200, the corresponding counter clockwise yawing moment $Y_{ccw}$ can be matched to original clockwise yawing moment $Y_{cw}$, and the air vehicle 100 thereby trimmed at the sideslip angle $\beta$, while still maintaining the side force $S_0$.

Thus, it is readily apparent that an existing spoiler arrangement of an existing air vehicle can be retrofittably modified, or alternatively an air vehicle may be initially fitted with a spoiler arrangement that is originally configured, to operate in accordance with the first aspect of the invention to provide the air vehicle with a desired side force, which may be desired for at least some types of flight or homing maneuvers, for example.

According to the first aspect of the invention, the auxiliary yaw moment generating arrangement 200 may be further configured for enabling augmentation of the side force $S_0$ that is originally generated as a result of the air vehicle assuming sideslip angle $\beta$ at zero rudder deflection $\delta_r$, to produce an augmented side force $S_{aug}$ that is greater than said initial side force $S_0$.

Such operation of the air vehicle 100 is referred to herein as the augmented operation mode, and requires the auxiliary yaw moment generating arrangement 200 to provide an augmented counter clockwise yawing moment $Y_{ccw}'$ that is significantly greater than that required to match the original clockwise yawing moment $Y_{cw}$. Such an augmented counter clockwise yawing moment $Y_{ccw}'$ may be provided in a number of different ways.

Referring to FIG. 4(*a*), the auxiliary yaw moment generating arrangement 200 comprises an oversized spoiler arrangement 220', similar to the spoiler arrangement 220 disclosed above, mutatis mutandis, with the main difference that the respective selectively deployable oversized port spoiler 222' and the respective selectively deployable oversized starboard spoiler 223' are each configured for providing more drag when fully or partially deployed, than the original spoilers 222, 223, respectively, for the same set of conditions. For example, the each one of the oversized port spoiler 222' and the oversized starboard spoiler 223' presents a larger frontal area to the airflow over the respective when fully or partially deployed than the respective original spoilers 222, 223. In the embodiment of FIG. 4(*a*), the oversized port spoiler 222' and the oversized starboard spoiler 223' are each longer than the original spoilers 222, 223.

Operation of the air vehicle 100 with the oversized spoiler arrangement 220' in augmented operation mode may be as follows. Referring again to FIG. 4(*a*), the air vehicle 100 comprising oversized spoiler arrangement 220' is shown at an initial condition in which the air vehicle is at a positive sideslip angle $\beta$ with respect to the relative wind direction W, with the rudder 45 at a rudder deflection $\delta_r$ of zero, and the auxiliary yaw moment generating arrangement 200 inoperational, and thus the oversized spoilers 222', 223' generating no differential drag, and indeed no drag per se.

The air vehicle 100 may initially adopt the position shown in FIG. 4(*a*) in the same manner as previously disclosed regarding FIG. 3(*a*), mutatis mutandis, for example.

As before, a side force $S_0$ is generated and a stabilizing net clockwise yaw moment $Y_{cw}$ is also generated, tending to yaw the air vehicle 100, if untrimmed, in a clockwise direction to once again align with the relative wind direction W. According to this aspect of the invention, and referring to FIG. 4(*b*), the oversized spoiler arrangement 220' of the auxiliary yaw moment generating arrangement 200 may be operated to provide a relatively larger drag $D_{aug}$ than would be produced by the original spoiler arrangement 220, and compensatory yaw trim that is significantly greater than that required for matching this clockwise yaw moment $Y_{cw}$. This would, if left alone, result in an augmented counter clockwise moment $Y_{ccw\_aug}'$ that would tend to increase the sideslip angle $\beta$ to a larger positive value. In the augmented operation mode, and referring to FIG. 4(*c*), the rudder 45 is also operated to provide a negative deflection ($\delta_r$ negative), to increase the side force to an augmented side force $S_{aug}$ (as seen in FIG. 4(*c*)) and thereby increase the clockwise yaw moment to provide an augmented clockwise moment $Y_{cw\ aug}'$ that will now match the augmented counter clockwise moment $Y_{ccw\ aug}'$, resulting in the air vehicle being trimmed in yaw at the desired sideslip angle $\beta$. Thus, the negative rudder deflection increases the side force produced by the air vehicle while the yaw moments generated thereby and due to the sideslip angle $\beta$ are countered by the compensatory augmented yaw moment generated by the oversized spoilers 222' and 223', trimming the air vehicle at sideslip angle $\beta$.

In practice, the oversized spoiler arrangement 220' and the rudder 45 may be actuated concurrently to concurrently provide matching yaw moments of opposite sign that cancel one another, while generating the desired side force. The magnitude of the desired side force may be varied as desired by controlling the simultaneous operation of the oversized spoiler arrangement 220' and the rudder 45 on the one hand, and the sideslip angle $\beta$. In general, the greater the differential drag force produced by oversized spoiler arrangement 220' and the greater the deflection of the rudder, the greater the magnitude of the side force generated thereby. Similarly, in general the greater the sideslip angle $\beta$, the greater the magnitude of the side force generated by the air vehicle 100.

It is also readily apparent from the foregoing that for some cases at least, it is possible to generate a desired side force even with a sideslip angle $\beta$ of zero, i.e., in conditions of no sideslip. Here, and referring to FIG. 4(d) a negative rudder deflection generates a side force F towards the port side, and induces a clockwise yaw moment $YM_1$, which is matched and compensated by a counter clockwise yaw moment $YM_2$ generated by operation (for example, concurrently) of the oversized spoiler arrangement 220' to provide the differential drag $F_D$ required for this counter clockwise yaw moment $YM_2$. It is also readily apparent from the foregoing that for some cases at least, the desired side force may be generated even with the original spoiler arrangement 220 and a sideslip angle $\beta$ of zero, i.e., in conditions of no sideslip, if the compensatory counter clockwise yaw moment required for doing requires a differential drag that is capable of being generated by the spoiler arrangement 220. Similar considerations apply when it is desired to generate a side force towards the starboard side, mutatis mutandis. Thus, in such conditions of no sideslip, the fuselage and the vertical stabilizer per se do not contribute to the side force. Rather, all the side force is generated due to the rudder deflection, and has a magnitude sufficient so that by means thereof the yaw generated by the respective spoiler arrangement can be trimmed. Thus, according to at least one aspect of the invention, the air vehicle may be configured having a relatively small moment arm relative to the center of gravity of the air vehicle, while on the other hand configured for providing large rudder deflections, and thus there is a relatively greater contribution of the side force and a relatively lower contribution of the moment arm of the side force, to the trimming yaw moment generated thereby. According to this aspect of the invention, at least one variation of the embodiment of the air vehicle 100 may comprise vertical stabilizers (comprising rudders) at the wing tips of wings 20 and 30 rather than vertical stabilizer 40, mutatis mutandis, a short distance aft of the center of gravity CG. According to this aspect of the invention, at least another variation of the embodiment of the air vehicle 100 may comprise vertical stabilizer 40 mounted at a short distance aft of the center of gravity CG rather than at the aft end of the fuselage. It is also readily apparent from the foregoing that for at least some cases, the oversized spoiler arrangement 220' of the auxiliary yaw moment generating arrangement 200 may also be operated to provide a compensatory yaw trim that matches the original clockwise yaw moment $Y_{cw}$, at conditions of the aforesaid positive sideslip angle $\beta$ and zero rudder deflection $\delta_r=0$, thereby avoiding diminishing the original side force $S_0$ generated by the air vehicle 100. This may be achieved by operating one or both spoilers 222', 223' in a similar manner to that disclosed for the embodiment of FIG. 3(b), to provide a reduced differential drag force $D_0$ on the port wing 20 with respect to the starboard wing 30 (relative to the relatively larger augmented drag $D_{aug}$ that is capable of being generated). In such a case, though, one or both of the oversized spoilers 222', 223' are only partially deployed, since the required differential drag $D_0$ is less than the maximum differential drag possible with the oversized spoilers 222', 223'.

Similarly, it also readily apparent from the foregoing that for at least some cases, the original spoiler arrangement 220 may also be operated in a similar manner to the oversized spoiler arrangement 220' to provide increased side force, though at different conditions. For example, there are at least some conditions in which the maximum differential drag $D_0$ capable of being generated by the original spoiler arrangement 220 is actually greater than actually needed for a given sideslip angle and/or rudder deflection, and thus the excess differential drag may be generated to provider additional yaw moment concurrently with appropriate rudder deflection to generate a larger side force, and the additional corresponding yaw moment being matched by the counter yaw moment generated as a result of the excess differential drag.

While the above operation of the original spoiler arrangement 220 and of the oversized spoiler arrangement 220', and of alternative variations thereof, has been described in the context of generating a differential drag force on the port wing, it is readily understood that the above operation also applies to operating the air vehicle 100 and the corresponding original spoiler arrangement 220 the oversized spoiler arrangement 220' in the context of generating a differential drag force on the starboard wing in a similar manner, mutatis mutandis, wherein the respective sideslip angle, rudder deflection and yaw moments are of opposite signs to those described.

Thus, in other words, both the oversized spoiler arrangement 220' and the original spoiler arrangement 220 (when the air vehicle 100 comprises one or the other) can each be operated to provide a respective range of differential drags (selectively in one or the other wing) at corresponding sets of conditions (though of course the oversized spoiler arrangement 220' can provide generally higher levels of differential drag than the original spoiler arrangement 220), and corresponding respective ranges of yawing moments in the corresponding direction.

Furthermore, it is readily apparent from the foregoing that the air vehicle 100 can be operated to provide a required or desired side force in the port direction by either adopting a suitable positive sideslip angle $\beta$, or providing a suitable negative rudder deflection, or both. The corresponding clockwise yaw moment induced as a result of this side force and its moment arm about the center of gravity CG can be effectively cancelled by operating the auxiliary yaw moment generating arrangement 200, for example in the form of the oversized spoiler arrangement 220' or the original spoiler arrangement 220, to produce a suitable differential drag force on the port wing 20, which, while not substantially affecting the generated side force, nevertheless induces a counterclockwise yaw moment via its moment arm from the center of gravity CG that balances the clockwise yaw moment induced by the side force.

Conversely, the air vehicle 100 can be operated to provide a required or desired side force in the starboard direction by either adopting a suitable negative sideslip angle β, or by providing a suitable positive rudder deflection, or both. The corresponding counter clockwise yaw moment induced as a result of this side force and its moment arm about the center of gravity CG can be effectively cancelled by operating the auxiliary yaw moment generating arrangement 200, for example in the form of the oversized spoiler arrangement 220' or the original spoiler arrangement 220, to produce a suitable differential drag force on the starboard wing 30, which, while not substantially affecting the generated side force, nevertheless induces a clockwise yaw moment via its moment arm from the center of gravity CG that balances the counter clockwise yaw moment induced by the side force.

Figure 4B:
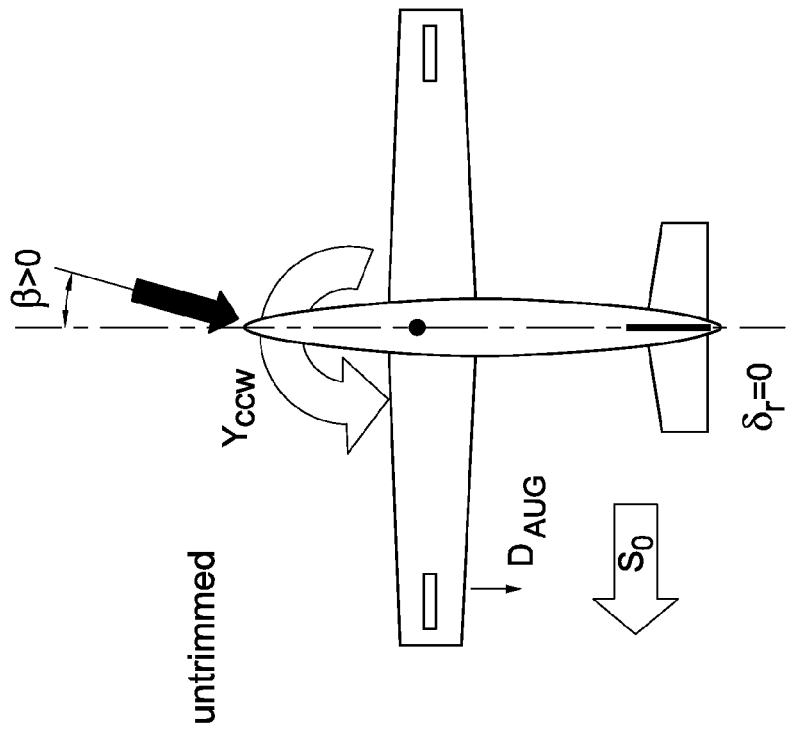
FIGS. 4(a) to 4(c) schematically illustrate operation of a variation of the embodiment of FIGS. 3(a) and 3(b) at a sideslip angle β>0: untrimmed and undeployed; untrimmed and deployed; and trimmed; respectively.
Figure 4A:
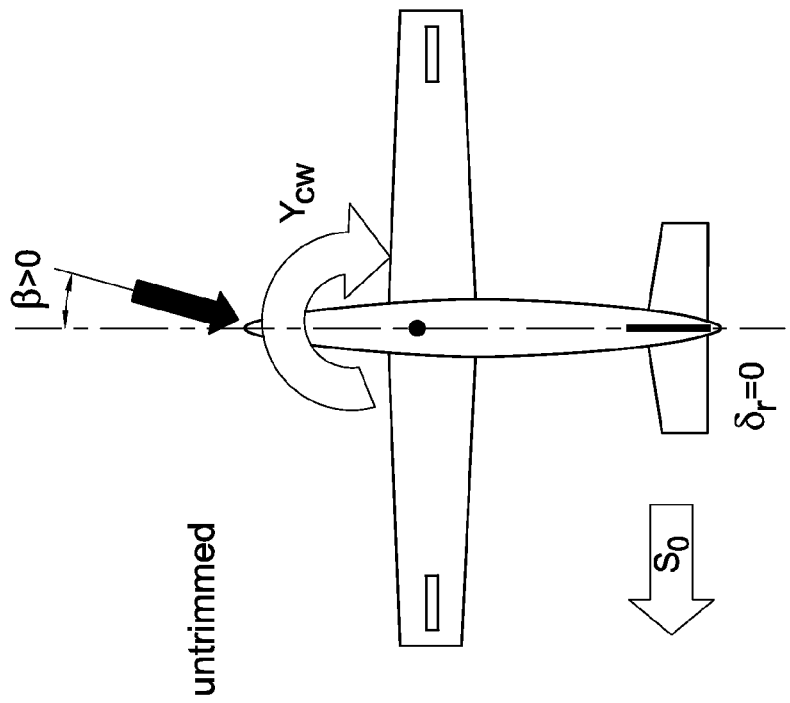
Figure 4D:
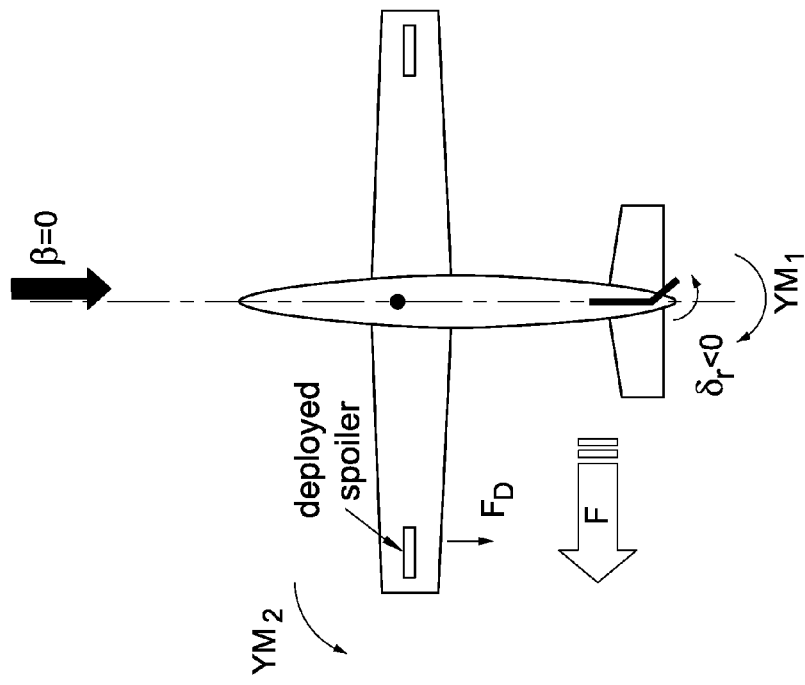
FIG. 4(d) schematically illustrate operation of a variation of the embodiment of FIGS. 3(a) and 3(b) at a sideslip angle β=0, trimmed.
Figure 4C:
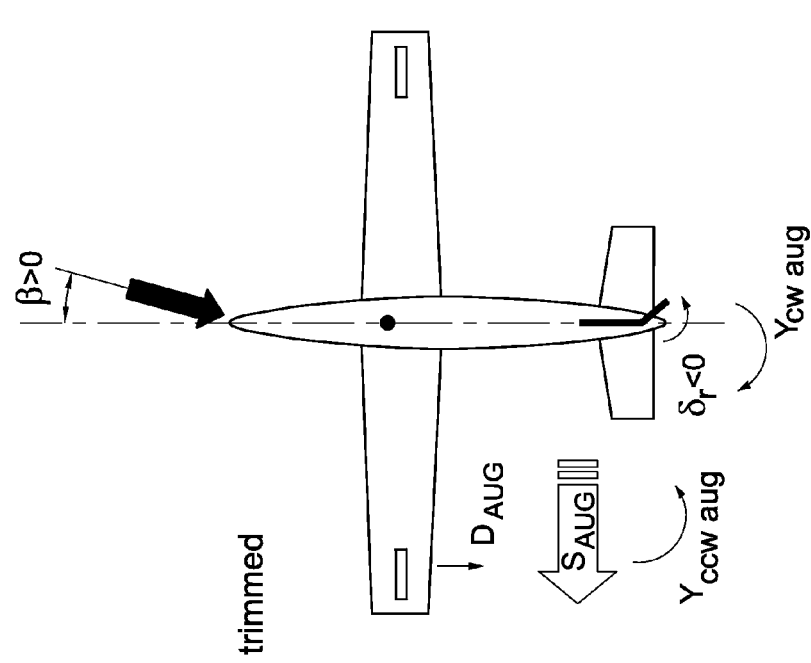
Figure 15:
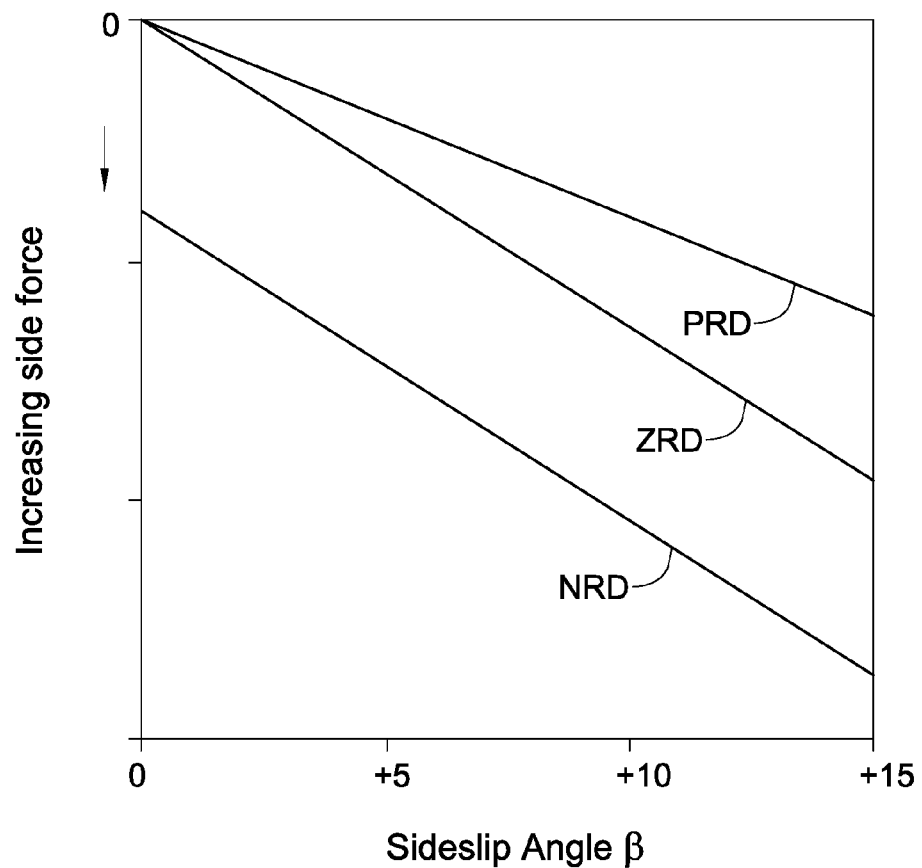
FIG. 15 schematically illustrates variation in side force as a function of side slip angle obtained with the embodiments of FIGS. 4(b), 4(c), 14(a) and 14(b).

Referring to FIG. 15, line NRD schematically illustrates the variation of side force generated with the embodiment of FIG. 4(c) as a function of sideslip angle, i.e., in conditions of a yaw moment being generated by the spoiler arrangement, and a counter yaw moment being generated by rudder deflection. It is readily apparent that the net side force generated in the port direction by negative rudder deflection in this trimmed configuration increases as the sideslip angle increases in the positive direction (the converse also being true, that the side force generated in the starboard direction by positive rudder deflection increases as the sideslip angle increases in the negative direction). It is also readily apparent that also in conditions or zero sideslip angle (embodiment of FIG. 4(d) without actuation of the spoiler arrangement), rudder deflection still generates a side force for the trimmed configuration.

Figure 14A:
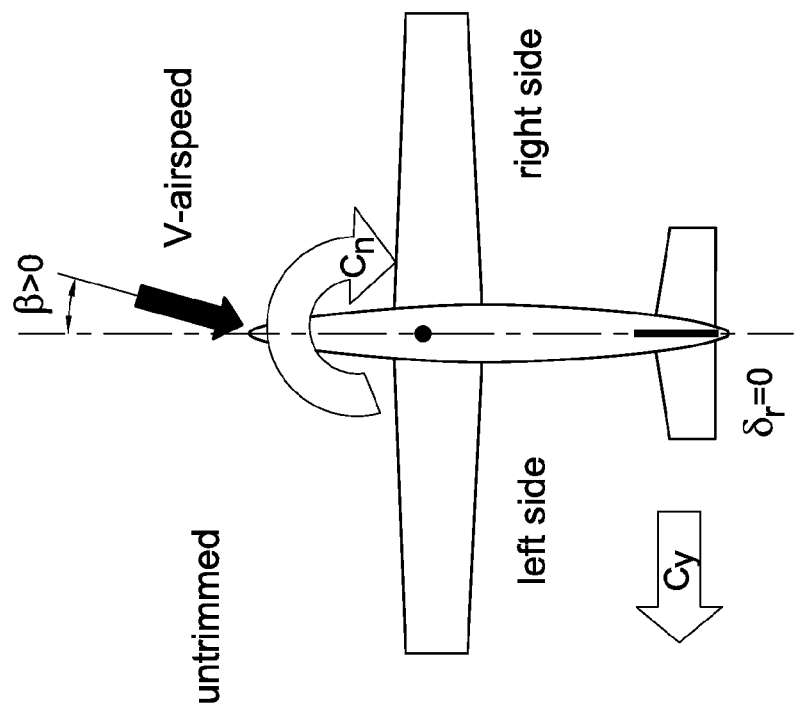

Referring again to FIG. 15, line ZRD schematically illustrates the variation of side force generated with the embodiments of FIG. 4(b) and FIG. 14(a) as a function of sideslip angle, i.e., in conditions of a yaw moment and side force both being generated by sideslip angle, and the air vehicle is initially untrimmed. It is readily apparent that side force generated in the port direction in conditions of zero rudder deflection for this untrimmed configuration also increases as the sideslip angle increases in the positive direction (the converse also being true, that the side force generated in the starboard direction in conditions of zero rudder deflection increases as the sideslip angle increases in the negative direction), but at zero sideslip angle, no side force is generated. It is also readily apparent that for the same positive sideslip angle, the side force generated with negative rudder deflection (line NRD) is significantly higher than with zero rudder deflection (and similarly regarding the magnitude of the starboard side force for negative sideslip angle, mutatis mutandis).

Referring again to FIG. 15, line PRD schematically illustrates the variation of side force generated with the embodiment of 14(b) as a function of sideslip angle, i.e., in conditions of a yaw moment being generated by sideslip angle, and the air vehicle is trimmed by positive rudder deflection. It is readily apparent that side force generated in the port direction by positive rudder deflection increases as the sideslip angle also increases in the positive direction (the converse also being true, that the side force generated in the starboard direction by negative rudder deflection increases as the sideslip angle increases in the negative direction), but also at zero sideslip angle, no side force is generated. It is also readily apparent that for the same positive sideslip angle, the side force generated with positive rudder deflection is significantly lower than with zero rudder deflection (line ZRD) and even lower than obtained with negative rudder deflection (line NRD) (and similarly regarding the magnitude of the starboard side force for negative sideslip angle, mutatis mutandis).

Figure 2C:
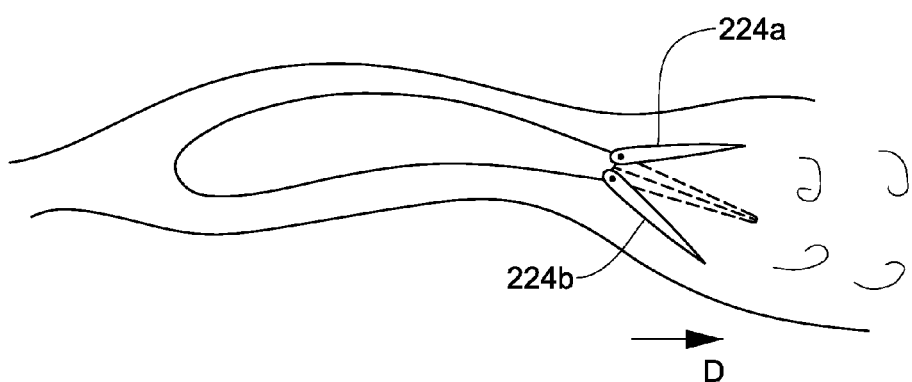
FIG. 2(c) is a side view of another variation of the embodiment of FIG. 2(a) comprising a split aileron.

In alternative variations of the first embodiment, ailerons 25 may form part or all of the auxiliary yaw moment generating arrangement 200, i.e., instead of or in addition to the oversized spoiler arrangement 220' or the original spoiler arrangement 220. In such alternative variations of the first embodiment, and referring to FIG. 2(c), ailerons 25 are in the form of split ailerons (also referred to herein as decelerons), enabling the ailerons to function normally in aerodynamic flight, and when the auxiliary yaw moment generating arrangement 200, one or both of the ailerons can each split into two halves 224a, 224b, the respective upper aileron half 224a pivoting upwards and the respective lower aileron half 224b pivoting downwards, thereby generating a differential drag force.

In the first embodiment disclosed above with reference to FIGS. 2(a) to 4(c), or in alternative variations thereof, the auxiliary yaw moment generating arrangement 200 comprises an oversized spoiler arrangement 220' or the original spoiler arrangement 220, each of which generates a differential drag by way of selectively deploying the respective spoilers. As is known in the art, conventional spoilers generate drag when deployed during conditions of aerodynamic flight, but also reduce aerodynamic lift when deployed. Accordingly, the differential drag generated by the oversized spoiler arrangement 220' or the original spoiler arrangement 220 may also be accompanied by a differential lift generated between the port and starboard wings, inducing a rolling moment, and this may be compensated by operating the ailerons 25 to generate a compensatory rolling moment.

In a second embodiment of the auxiliary yaw moment generating arrangement, designated with the reference numeral 300, the auxiliary yaw moment generating arrangement 300 is configured for selectively providing to the air vehicle the aforesaid second yaw moment by providing a differential drag, in which the differential drag is generated based on airbrake systems that allow selectively providing drag in each wing independently of one another, while substantially unaffecting the lift generated by the respective wings.

Figure 5A:
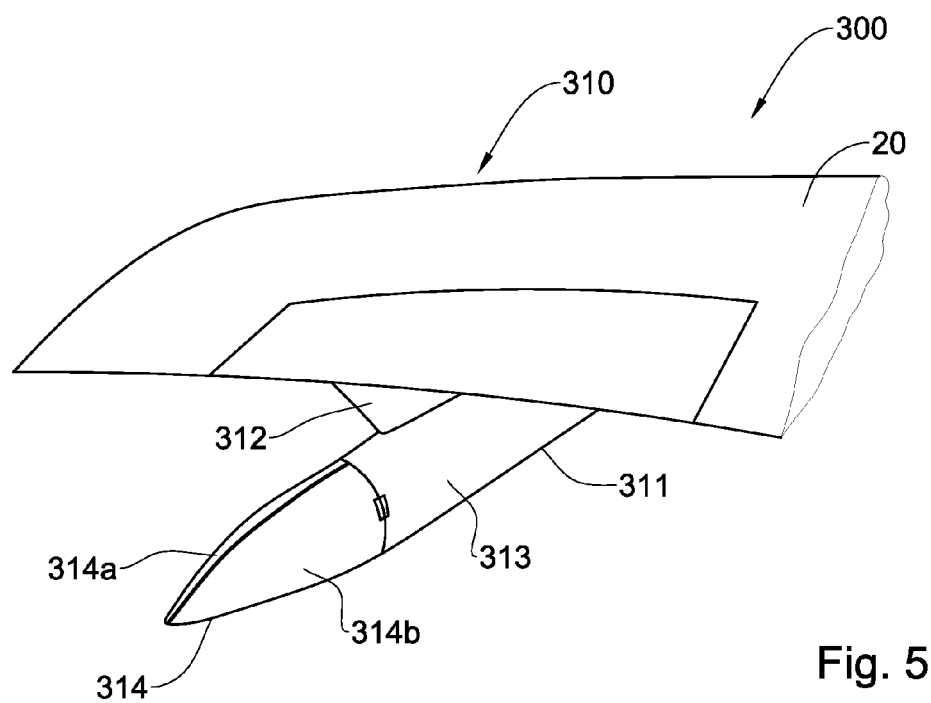
FIGS. 5(a) and 5(b) are isometric views of a second embodiment of an auxiliary yaw moment generating arrangement, in the closed configuration and the open configuration, respectively.
Figure 5B:
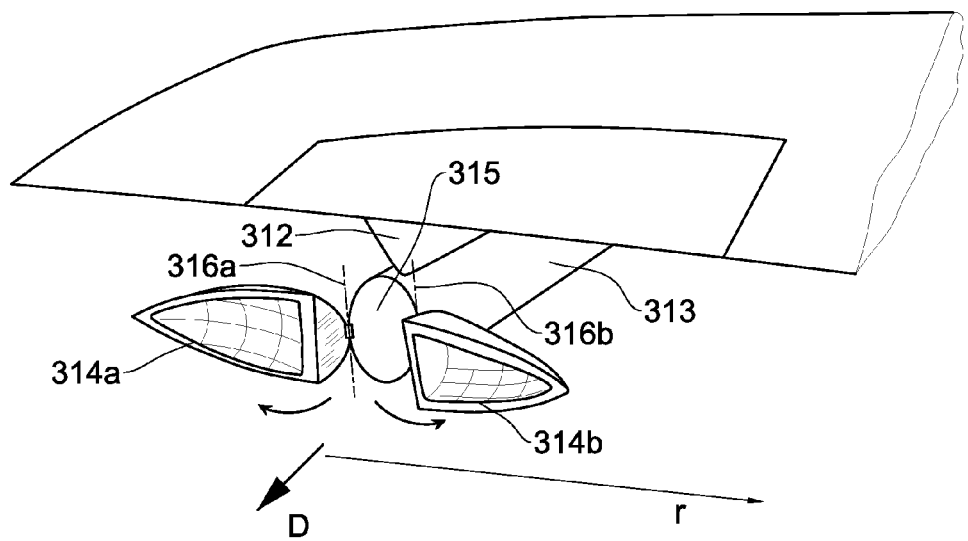

Referring to FIGS. 5(a) and 5(b), the auxiliary yaw moment generating arrangement 300 comprises an airbrake system 310. The airbrake system 310 comprises a pod-like body 311 mounted to an underside of each one of the port and starboard wings of the air vehicle 100 via a respective pylon 312, though only the port wing 20 is illustrated. It is to be noted that in alternative variations of this embodiment, the pod-like body may be instead mounted to respective upper sides of the wings, for example.

Each pod-like body 311 comprises a rounded nose (not shown) and generally streamlined intermediate body section 313, and an aft section 314. The aft section 314 comprises two halves, 314a and 314b, each pivotably mounted to the aft end 315 of the intermediate body section 313, enabling the halves 314a and 314b to selectively and reversibly pivot from a closed configuration to an open configuration. In the undeployed or closed configuration, illustrated in FIG. 5(a), the halves 314a and 314b come together to form a closed body, having a streamlined shape—for example an ogive or conical shape, and thus generates relatively little drag. In the open or deployed configuration, illustrated in FIG. 5(b), the halves 314a and 314b pivot outwardly about respective axes 316a and 316b (which in the illustrated embodiment are parallel to the y-axis), thereby presenting a frontal area that interferes with the airflow, thereby generating a significant drag force. Optionally, the amount of pivoting of the halves 314*a* and 314*b* may be controllably chosen, to provide a range of drags for particular set of flight conditions. It is therefore readily understood that, by selectively operating the airbrake system 310 and fully or partially opening the aft section 314 of one or both (differentially) bodies 311, a differential drag force D may be generated on one wing with respect to the other wing, and a corresponding yaw moment generated on account of the moment arm r between the center of application of the differential drag force and the center of gravity CG. Thus, in a similar manner to that disclosed above for the first embodiment of the auxiliary yaw moment generating arrangement or alternative variations thereof, mutatis mutandis, the auxiliary yaw moment generating arrangement according to the second embodiment may also be operated to enable a desired side force to be generated in either the port direction or starboard direction, with or without rudder deflection, or with or without sideslip angle. In an alternative variation of this embodiment, the intermediate body section 313 may, additionally or alternatively, comprise selectively deployable/retractable airbrake side panels, or the like, to augment or provide the desired differential drag force.

Figure 6A:
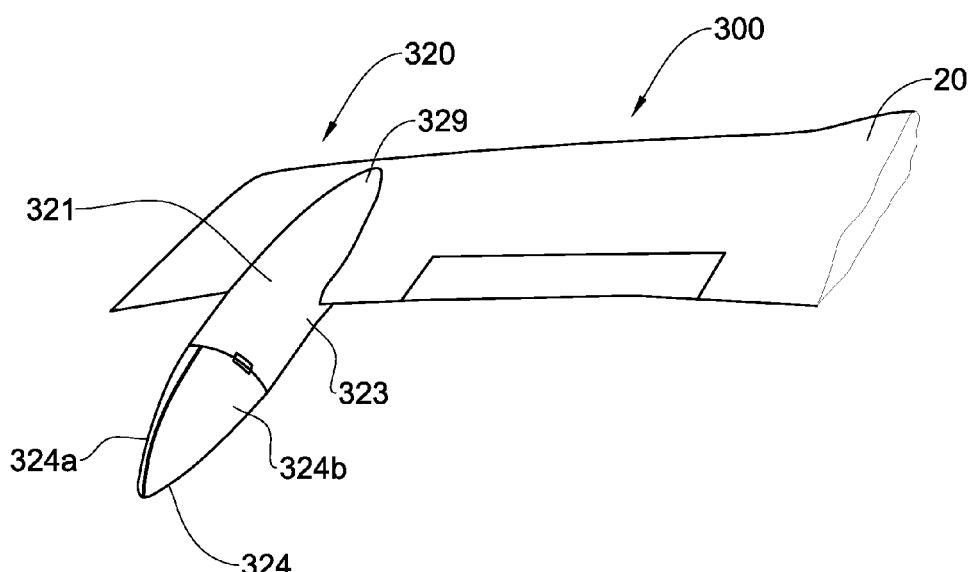
FIGS. 6(a) and 6(b) are isometric views of an alternative variation of the embodiment of FIGS. 5(a) and 5(b), in the closed configuration and the open configuration, respectively.
Figure 6B:
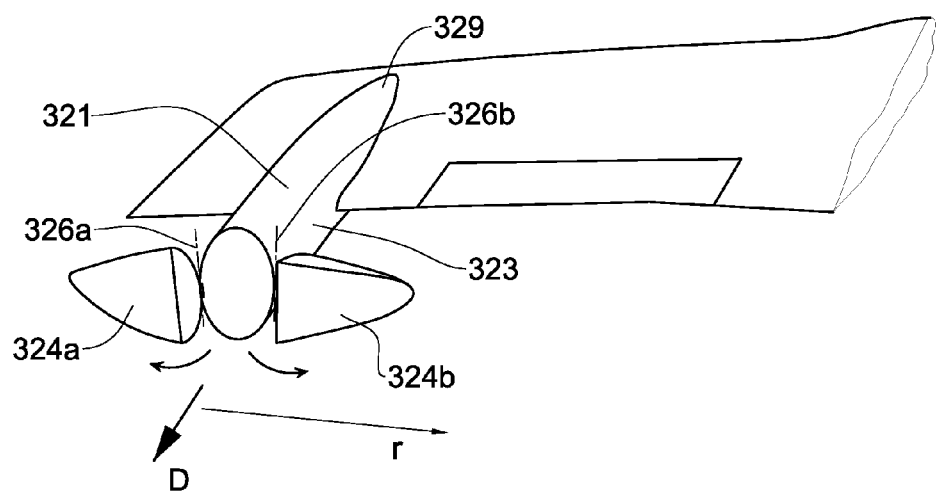

Referring to FIGS. 6(*a*) and 6(*b*), an alternative variation of the second embodiment of the auxiliary yaw moment generating arrangement 300, comprises a similar airbrake system 320. The airbrake system 320 comprises a boom-like body 321 mounted to each one of the port and starboard wings of the air vehicle 100, though only the port wing 20 is illustrated. Each boom-like body 321 comprises a rounded nose section 329 and generally streamlined intermediate body section 323, and an aft section 324. The aft section 324 comprises two halves, 324*a* and 324*b*, each pivotably mounted to the aft end 325 of the intermediate body section 323, enabling the halves 324*a* and 324*b* to selectively and reversibly pivot from a closed configuration to an open configuration. In the closed or undeployed configuration, illustrated in FIG. 6(*a*), the halves 324*a* and 324*b* come together to form a closed body, having a streamlined shape—for example an ogive or conical shape, and thus generates little drag. In the open or deployed configuration, illustrated in FIG. 6(*b*), the halves 324*a* and 324*b* pivot outwardly about respective axes 326*a* and 326*b* (which in the illustrated embodiment are parallel to the y-axis), thereby presenting a frontal area that interferes with the airflow, thereby generating a significant drag force. Optionally, the amount of pivoting of the halves 324*a* and 324*b* may be controllably chosen, to provide a range of drags for particular set of flight conditions. It is therefore readily understood that, by selectively operating the airbrake system 320 and fully or partially opening the aft section 324 of one or both (differentially) bodies 321, a differential drag force D may be generated on one wing with respect to the other wing, and a corresponding yaw moment generated on account of the moment arm r between the center of application of the differential drag force and the center of gravity CG. Thus, in a similar manner to that disclosed above for the first embodiment of the auxiliary yaw moment generating arrangement or alternative variations thereof, mutatis mutandis, the auxiliary yaw moment generating arrangement according to the second embodiment may also be operated to enable a desired side force to be generated in either the port direction or starboard direction, with or without rudder deflection, or with or without sideslip angle. In an alternative variation of this embodiment, the intermediate body section 313 may, additionally or alternatively, comprise selectively deployable/retractable airbrake side panels, or the like, to augment or provide the desired differential drag force. Optionally, for alternative variations of the air vehicle in which the respective empennage comprises plurality of boom mounted vertical stabilizers, such booms may be configured for operating in a similar manner to the airbrake system 320.

Figure 7A:
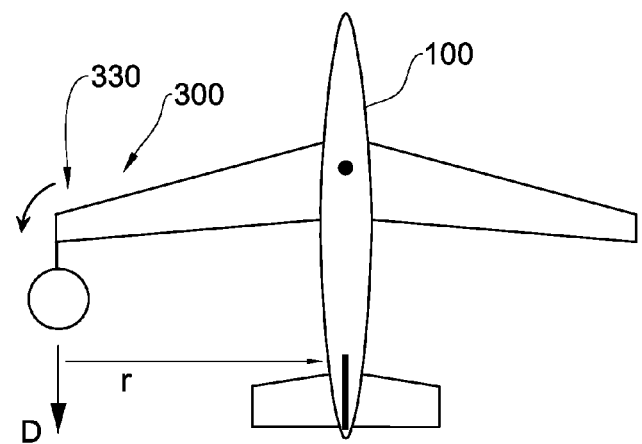
FIG. 7(a) is a top view of an air vehicle including of an alternative variation of the embodiment of FIGS. 5(a) and 5(b)
Figure 7B:
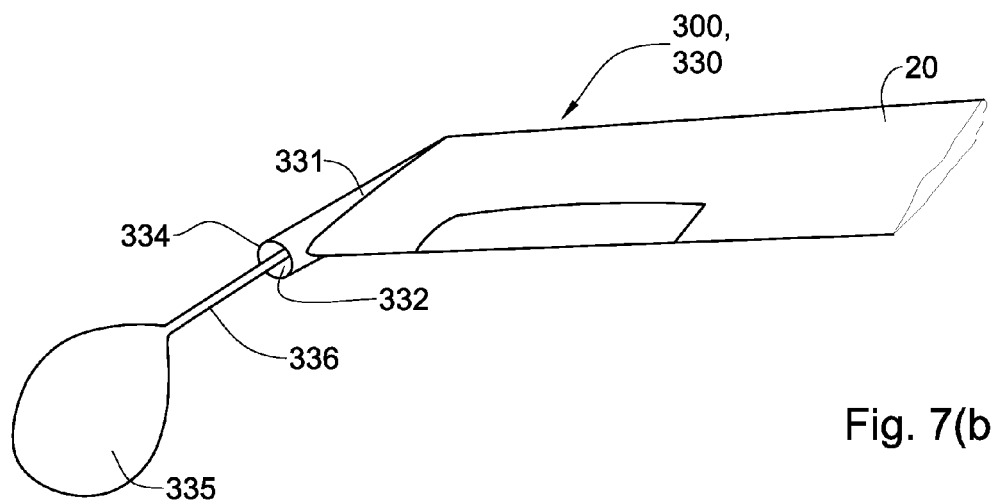
FIGS. 7(b) and 7(c) are isometric views of the embodiment of FIG. 7(a), in the deployed configuration and the undeployed configuration, respectively.
Figure 7C:
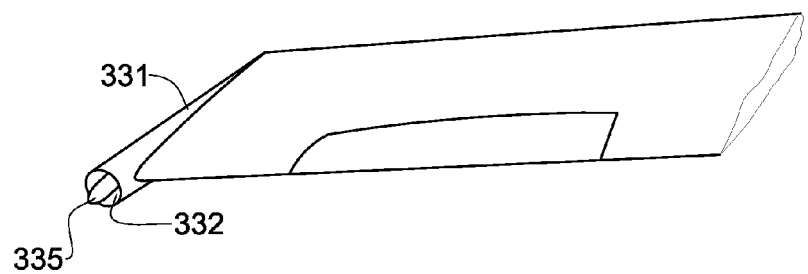
Figure 8A:
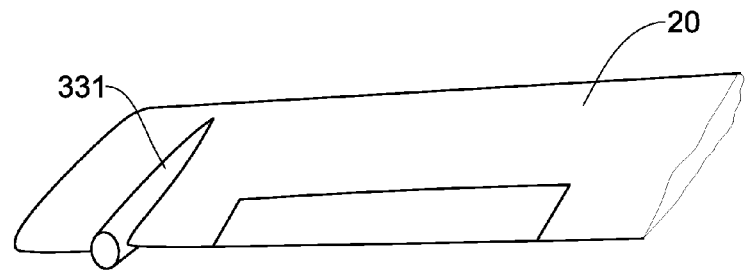
FIGS. 8(a) and 8(b) are isometric views of an alternative variation of the embodiment of FIGS. 5(a) and 5(b), in the undeployed configuration and the deployed configuration, respectively.
Figure 8B:
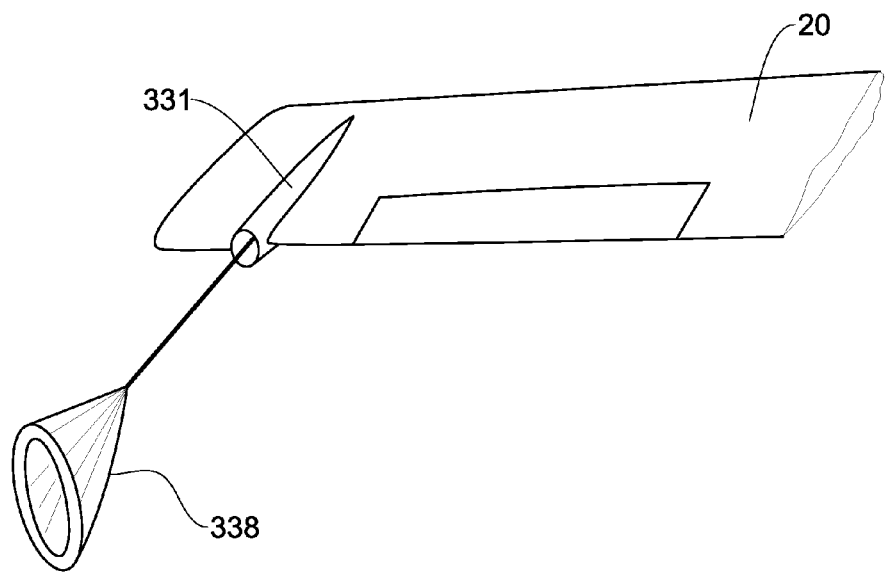
Figure 9A:
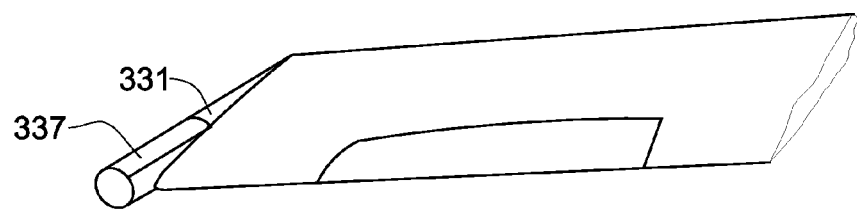
FIGS. 9(a) and 9(b) are isometric views of an alternative variation of the embodiment of FIGS. 5(a) and 5(b), in the undeployed configuration and the deployed configuration, respectively.
Figure 9B:
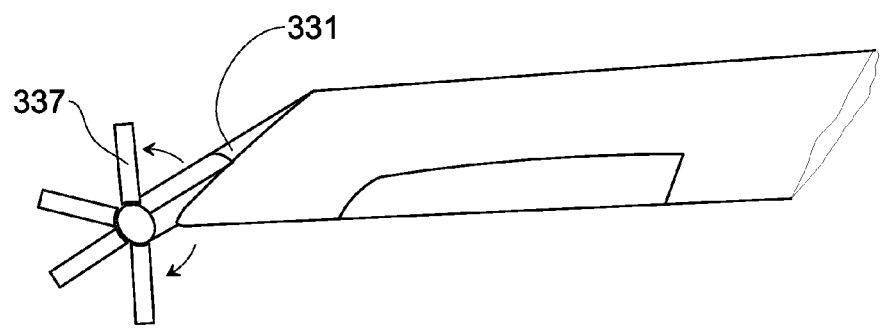

Referring to FIGS. 7(*a*) to 7(*c*), an alternative variation of the second embodiment of the auxiliary yaw moment generating arrangement 300 comprises another configuration of airbrake system, designated with reference numeral 330. The airbrake system 330 comprises an aerodynamically-faired casing 331 mounted to each one of the port and starboard wings of the air vehicle 100, though in FIGS. 7(*b*) and 7(*c*) only the port wing 20 is illustrated. Each casing 331 has is aerodynamically contoured to minimize drag, defines an internal volume 332, and has an open aft end 334 in open communication with the internal volume 332. An inflatable balloon 335 is accommodated, in its deflated state, within the internal volume 332 (FIG. 7(*c*)), and may be selectively deployed by means of connecting element 336 when inflated (FIGS. 7(*a*), 7(*b*)), and suitable inflating system may be provided for doing so. For example, connecting element 336 may comprise a hose that may be reeled in and out of the open aft end 334 via a suitable reeling system (not shown) and connected to a pressurized air or other gas supply (not shown), and including a suitable valve. In the inflated configuration, illustrated in FIGS. 7(*a*) and 7(*b*), the inflated balloon presents a frontal area that interferes with the airflow, thereby generating a significant drag force. Optionally, the amount of inflation of the balloon 335 may be controllably chosen, to provide a range of drags for particular set of flight conditions. It is therefore readily understood that, by selectively operating the airbrake system 330 and fully or partially inflating the balloon 335 on one or both (differentially) wings, a differential drag force D may be generated on one wing with respect to the other wing, and a corresponding yaw moment generated on account of the moment arm r between the center of application of the differential drag force and the center of gravity CG. Thus, in a similar manner to that disclosed above for the first embodiment of the auxiliary yaw moment generating arrangement or alternative variations thereof, mutatis mutandis, the auxiliary yaw moment generating arrangement according to this variation of the second embodiment may also be operated to enable a desired side force to be generated in either the port direction or starboard direction, with or without rudder deflection, or with or without sideslip angle. Alternatively, and referring FIGS. 8(*a*) and 8(*b*), the inflatable balloon may be replaced with any other suitable device 338 capable of being selectively retracted and stowed in the internal volume 332 to minimize drag, and of being selectively deployable to an outside of the casing 331 to generate a substantial drag for the respective wing, without significantly affecting the lift of the respective wing. For example, the device 338 may comprise a drogue or the like. Referring to FIGS. 9(*a*) and 9(*b*), each casing 331 may be configured, additionally or alternatively, with a plurality of air braking panels 337 having a closed configuration and an open configuration. In the closed configuration illustrated in FIG. 9(*a*), the panels 337 are substantially flush with the outer surface of the respective casing 331, while in the open configuration, illustrated in FIG. 9(*b*), the panels 337 pivot outwardly about respective axes, thereby presenting a frontal area that interferes with the airflow, thereby generating a significant drag force. Optionally, the amount of pivoting of the panels 337, collectively or individually for each casing 331, may be controllably chosen, to provide a range of drags for particular set of flight conditions.

Figure 10A:
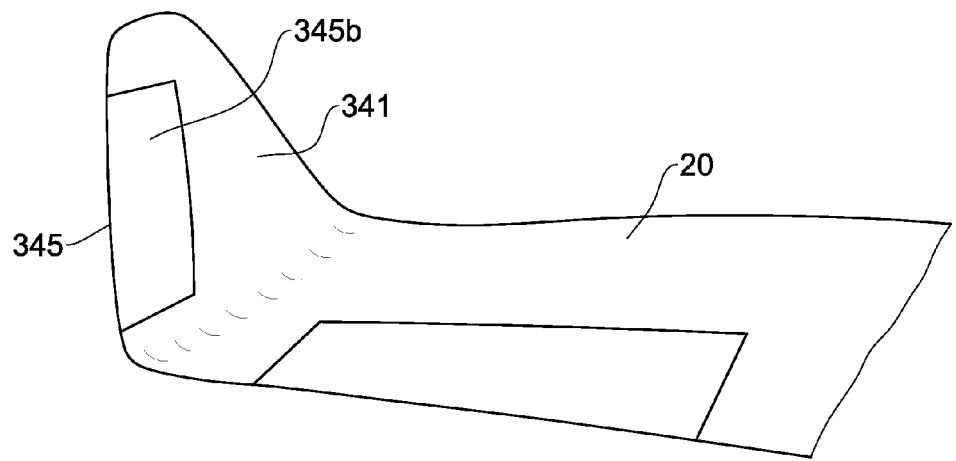
FIGS. 10(a) and 10(b) are isometric views of an alternative variation of the embodiment of FIGS. 5(a) and 5(b), in the undeployed configuration and the deployed configuration, respectively.
Figure 10B:
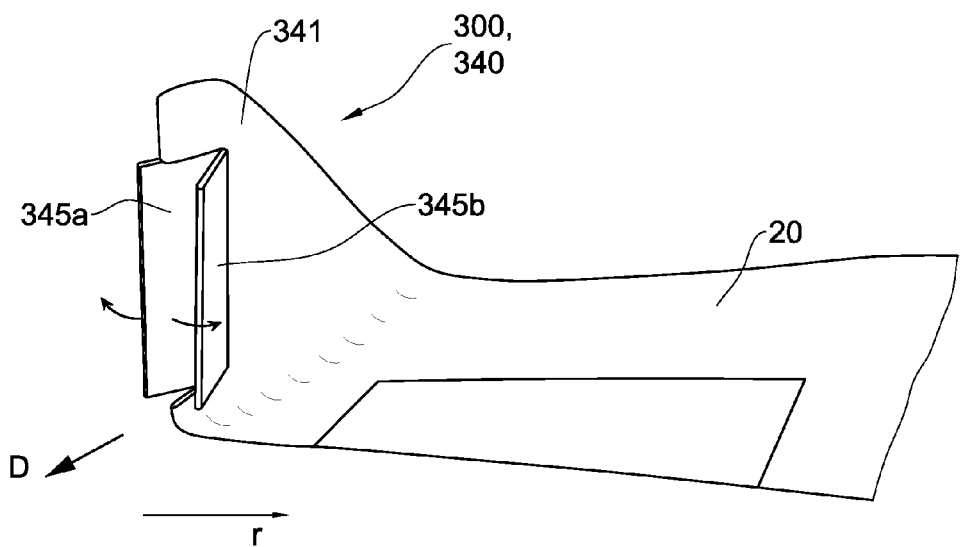

Referring to FIGS. 10(a) and 10(b), another alternative variation of the second embodiment of the auxiliary yaw moment generating arrangement 300, comprises an airbrake system 340, comprising an winglet-like element 341 mounted to each one of the port and starboard wings of the air vehicle 100, though only the port wing 20 is illustrated. While in the illustrated embodiment of FIGS. 10(a) and 10(b) each winglet-like element 341 is located at the respective wing tips of the wings of the air vehicle, in other alternative variations of this illustrated embodiment, the winglet-like elements 341 may be mounted further inboard on the respective wings. Each winglet-like element 341 is based on aerofoil cross-sections, and the span of each winglet-like element is generally aligned with the y-axis, though in at least some alternative variations of the illustrated embodiment of FIGS. 10(a) and 10(b) the respective spans may anhedrally or dihedrally disposed with respect to the respective wing. Each winglet-like element 341 comprises an actuable aft section 345 formed as a split-rudder comprising two halves, 344a and 344b, each pivotably mounted thereto, enabling the halves 344a and 344b to selectively and reversibly pivot from a closed configuration to an open configuration. In the closed configuration, illustrated in FIG. 10(a), the halves 344a and 344b come together to form a closed body with the respective winglet-like element 341, having a streamlined shape and thus generating little drag. In the open configuration, illustrated in FIG. 10(b), the halves 344a and 344b pivot outwardly about respective axes, thereby presenting a frontal area that interferes with the airflow, thereby generating a significant drag force. Optionally, the amount of pivoting of the halves 344a and 344b may be controllably chosen, to provide a range of drags for particular set of flight conditions. It is therefore readily understood that, by selectively operating the airbrake system 340 and fully or partially opening the aft section 345 of one or both (differentially) of the winglet-like elements 341, a differential drag force D may be generated on one wing with respect to the other wing, and a corresponding yaw moment generated on account of the moment arm r between the center of application of the differential drag force and the center of gravity CG. Thus, in a similar manner to that disclosed above for the first embodiment of the auxiliary yaw moment generating arrangement or alternative variations thereof, mutatis mutandis, the auxiliary yaw moment generating arrangement according to the second embodiment may also be operated to enable a desired side force to be generated in either the port direction or starboard direction, with or without rudder deflection, or with or without sideslip angle.

In a third embodiment of the auxiliary yaw moment generating arrangement, designated with the reference numeral 400, the auxiliary yaw moment generating arrangement 400 is configured for selectively providing to the air vehicle the aforesaid second yaw moment by providing a differential drag, in which the differential drag is generated based on airbrake systems mounted to the fuselage rather than the wings.

Figure 11:
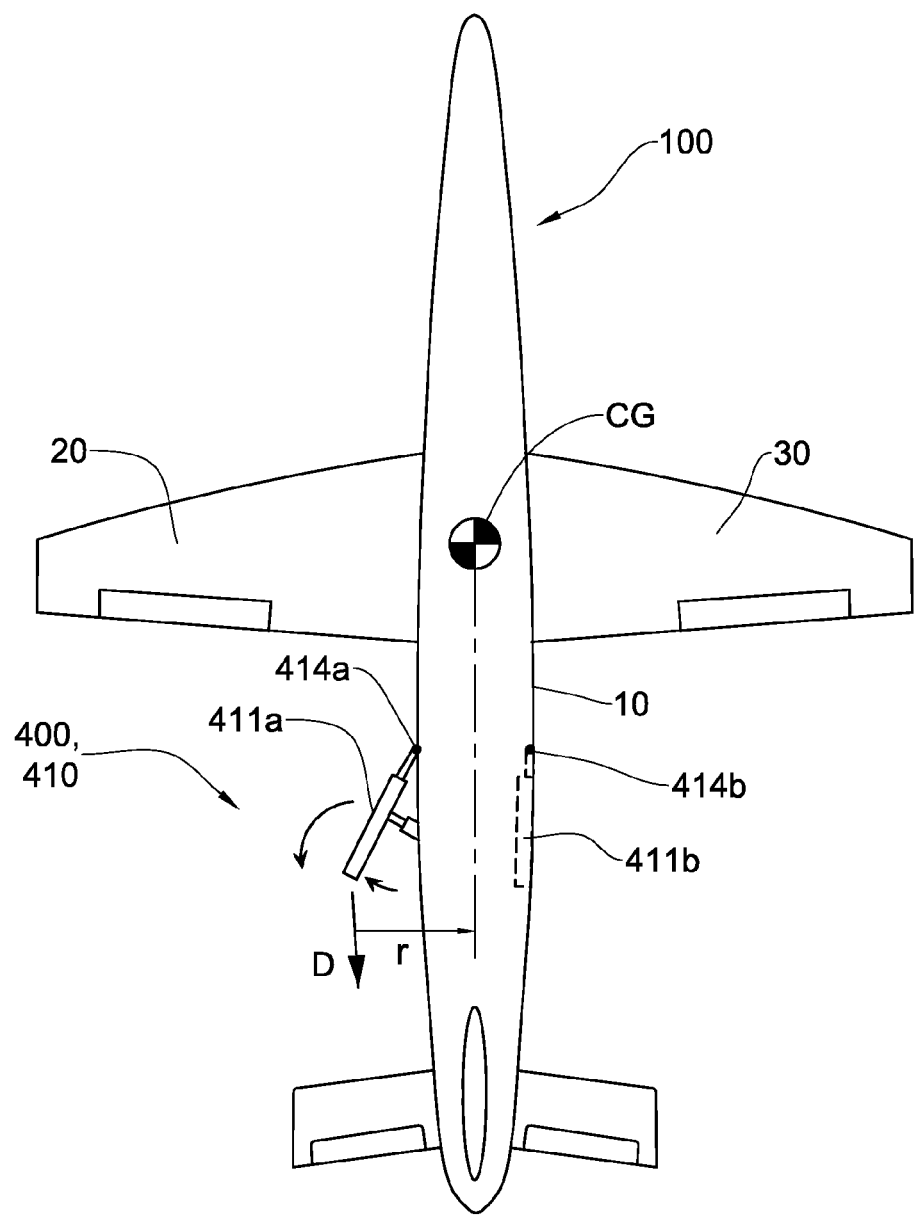
FIG. 11 is a top view of an air vehicle including of a third embodiment of an auxiliary yaw moment generating arrangement.

Referring to FIG. 11, the auxiliary yaw moment generating arrangement 400 comprises an airbrake system 410. The airbrake system 410 comprises a panel 411a and a panel 411b, respectively mounted to the port and starboard sides of the fuselage 10 of the air vehicle 100. Each panel 411a, 411b is pivotably mounted to the respective side of the fuselage 10, enabling the panels 411a, 411 to individually selectively and reversibly pivoted from a closed configuration to an open configuration. In the closed configuration, illustrated in FIG. 11 for the starboard panel 411b, the respective panel is substantially flush with the fuselage skin, and thus generates little drag. In the open configuration, illustrated in FIG. 11 for the port panel 411a, the respective panel pivots outwardly about the respective axes 414a or 414b (which in the illustrated embodiment are generally parallel to the y-axis), thereby presenting a frontal area that interferes with the airflow, thereby generating a significant drag force. Optionally, the amount of pivoting of each of the panels 411a, 411b may be controllably chosen, to provide a range of drags for particular set of flight conditions. It is therefore readily understood that, by selectively operating the airbrake system 410 and fully or partially opening the one or both (differentially) panels 411a, 41b, a differential drag force D may be generated on one side of the fuselage 10 with respect to the other side of the fuselage 10, and a corresponding yaw moment generated on account of the moment arm r between the center of application of the differential drag force and the center of gravity CG. Thus, in a similar manner to that disclosed above for the first embodiment of the auxiliary yaw moment generating arrangement or alternative variations thereof, mutatis mutandis, the auxiliary yaw moment generating arrangement according to the third embodiment may also be operated to enable a desired side force to be generated in either the port direction or starboard direction, with or without rudder deflection, or with or without sideslip angle.

In a fourth embodiment of the auxiliary yaw moment generating arrangement, designated with the reference numeral 500, the auxiliary yaw moment generating arrangement 500 is configured for selectively providing to the air vehicle the aforesaid second yaw moment by generating a differential thrust force, rather than a differential drag, based on selectively and differentially controlling thrust generated on the port side and the starboard side of the air vehicle.

Figure 12A:
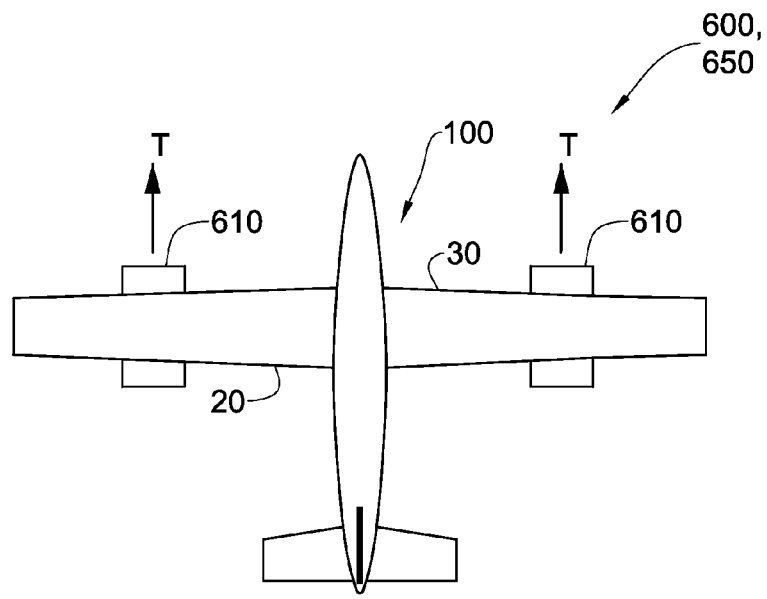
FIGS. 12(a) and 12(b) are top views of an air vehicle including a fourth embodiment of an auxiliary yaw moment generating arrangement, in the inoperative configuration providing equal thrust, and the operative configuration providing a reverse thrust in one propulsion unit, respectively.
Figure 12B:
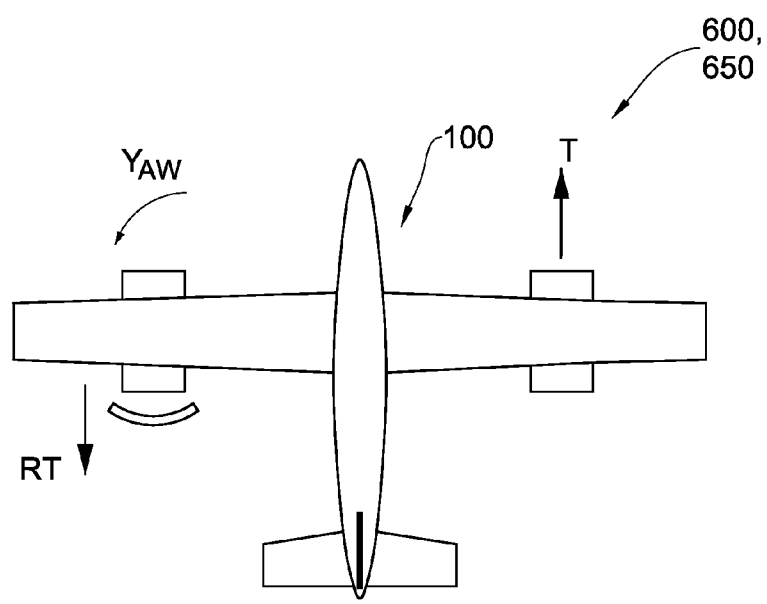

Referring to FIGS. 12(a) and 12(b), the air vehicle 100 comprises a propulsion system 600 including a propulsion unit 610 mounted to each one of wings 20 and 30, each propulsion unit 610 developing a forward thrust T at a respective lateral distance R from the center of gravity CG, taken along a direction parallel to the x axis. The propulsion units 610 are also each configured for individually and selectively generating a reverse thrust RT. Reverse thrust may be generated, for example via a respective thrust reverser in the case or turbofan or turbojet propulsion units, or by reversing the pitch of rotor blades in propfan, turbofan or propeller based propulsion units, for example. In this embodiment, the auxiliary yaw moment generating arrangement 650 comprises propulsion system 600, operated in a manner to provide a differential thrust between the port and starboard propulsion units 610. For example, in the inoperative configuration, wherein the auxiliary yaw moment generating arrangement 650 is not generating any yaw moments, the port and starboard propulsion units 610 generate the same thrust T, as illustrated in FIG. 12(a). Referring to FIG. 12(b), in the operate configuration one or the other of the port and starboard propulsion units 610 is operated to provide a reverse thrust RT, effectively providing a differential rearwards force on that side of the air vehicle with respect to the other side of the air vehicle, where normal thrust T is maintained, and a corresponding yaw moment generated on account of the moment arm R between the center of application of the differential rearwards force and the center of gravity CG. Thus, in a similar manner to that disclosed above for the first embodiment of the auxiliary yaw moment generating arrangement or alternative variations thereof with respect to deferential drag, mutatis mutandis, the auxiliary yaw moment generating arrangement according to the fourth embodiment may also be operated to enable a desired side force to be generated in either the port direction or starboard direction, with or without rudder deflection, or with or without sideslip angle, by providing the aforesaid differential rearwards force.

Figure 13A:
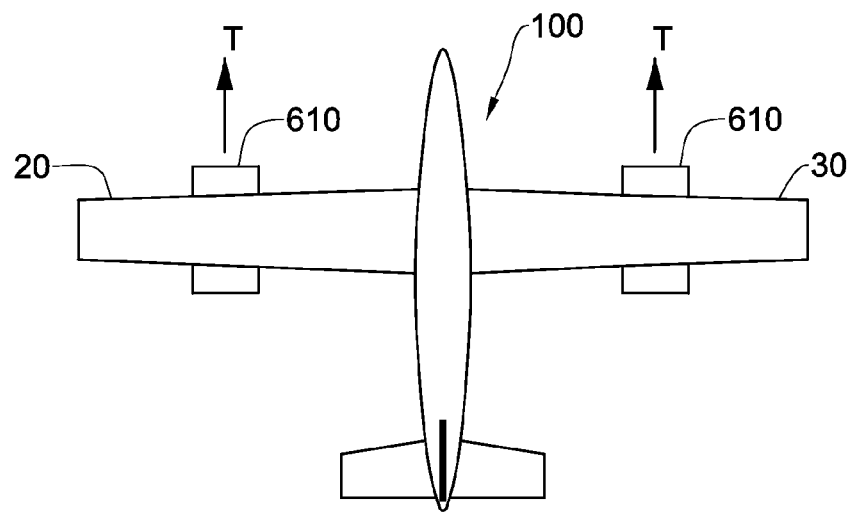
FIGS. 13(a) and 13(b) are top views of an air vehicle including an alternative variation of the embodiment of FIGS. 12(a) and 12(b), in the inoperative configuration providing equal thrust, and the operative configuration providing a thrust differential, respectively.
Figure 13B:
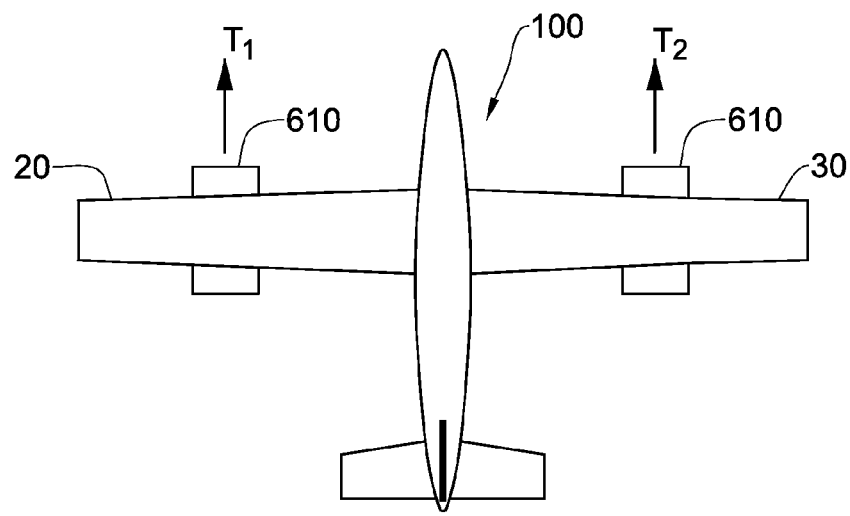

Alternatively, and referring to FIGS. 13(a) and 13(b), the fourth embodiment of the auxiliary yaw moment generating arrangement 650 may be operated to provide differential thrust between the port and starboard propulsion units 610 by selectively providing a thrust T1 by the port propulsion unit 610 that is different to the thrust T2 provided by the starboard propulsion unit 610. This results effectively in a differential rearwards force being generated on the side of the air vehicle generating the lower thrust with respect to the other side of the air vehicle that generates the higher thrust, and in a similar manner to that described for the embodiment of FIGS. 12(a) and 12(b), a corresponding yaw moment generated on account of the moment arm R between the center of application of this differential rearwards force and the center of gravity CG. Thus, in a similar manner to that disclosed above for the first embodiment of the auxiliary yaw moment generating arrangement or alternative variations thereof with respect to deferential drag, mutatis mutandis, the auxiliary yaw moment generating arrangement according to this variation of the fourth embodiment may also be operated in this manner to enable a desired side force to be generated in either the port direction or starboard direction, with or without rudder deflection, or with or without sideslip angle, by providing the aforesaid differential rearwards force.

It is to be noted that the air vehicle disclosed herein may comprise more than one of the above embodiments or variations thereof of the auxiliary yaw moment generating arrangement. For example, the air vehicle may comprise the auxiliary yaw moment generating arrangement embodiment of FIGS. 1(a) to 3(b), and/or the auxiliary yaw moment generating arrangement embodiment of FIGS. 4(a) to 4(c), and/or the auxiliary yaw moment generating arrangement embodiment of FIGS. 5(a) and 5(b), and/or the auxiliary yaw moment generating arrangement embodiment of FIGS. 6(a) and 6(b), and/or the auxiliary yaw moment generating arrangement embodiment of FIGS. 7(a) to 7(c), and/or the auxiliary yaw moment generating arrangement embodiment of FIGS. 8(a) and 8(b), and/or the auxiliary yaw moment generating arrangement embodiment of FIGS. 9(a) and 9(b), and/or the auxiliary yaw moment generating arrangement embodiment of FIGS. 10(a) and 10(b), and/or the auxiliary yaw moment generating arrangement embodiment of FIG. 11, and/or the auxiliary yaw moment generating arrangement embodiment of FIGS. 12(a) and 12(b), and/or the auxiliary yaw moment generating arrangement embodiment of FIGS. 13(a) and 13(b).

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed example embodiments in accordance with the invention, it will be appreciated that many changes may be made therein without departing from the spirit of the invention.

The invention claimed is:

1. A method for providing a controllable net side force to an air vehicle having a vertical stabilizer arrangement, the method comprising:
   (A) selectively causing said vertical stabilizer arrangement to generate a first side force in a first side direction to provide said controllable net side force, said first side force inducing a corresponding first yaw moment in a first yaw direction; and
   (B) selectively providing to the air vehicle a second yaw moment in a second yaw direction, said second yaw moment being induced by a force component of an auxiliary force applied to said air vehicle, said force component being in a force direction that is non-parallel with respect to said first side direction and said force component being spaced from a center of gravity of the air vehicle, said auxiliary force having a second auxiliary force component in a direction parallel to said first side direction;
   wherein said second yaw direction is opposed to said first yaw direction;
   wherein said net side force is provided by a difference between said first side force and said second auxiliary force component, and is non-zero; and
   wherein, responsive to said net side force, the air vehicle moves in a sideways direction.

2. The method according to claim 1, wherein said first yaw moment is of substantially the same magnitude as said second yaw moment.

3. The method according to claim 1, wherein in step (A) comprises one of:
   causing the air vehicle to adopt a non-zero sideslip angle to the relative wind direction, and providing a zero rudder deflection for said vertical stabilizer arrangement;
   causing the air vehicle to adopt a positive sideslip angle to the relative wind direction, and providing a negative rudder deflection for said vertical stabilizer arrangement;
   causing the air vehicle to adopt a negative sideslip angle to the relative wind direction, and providing a positive rudder deflection for said vertical stabilizer arrangement; or
   causing the air vehicle to adopt a zero sideslip angle to the relative wind direction, and providing one of a negative rudder deflection and a positive rudder deflection for said vertical stabilizer arrangement.

4. The method according to claim 1, wherein said second yaw moment is induced independently of at least one of:
   generating a second side force in a second side direction, wherein said second side direction is opposed to said first side direction;
   operating a pitch control surface of the air vehicle; or
   operating said vertical stabilizer arrangement.

5. The method according to claim 1, wherein said force component comprises a differential force generated between a port side and a starboard side of the air vehicle.

6. The method according to claim 5, wherein said differential force is substantially orthogonal to a yaw axis of the air vehicle and substantially orthogonal to said first side force direction.

7. The method according to claim 5, wherein said differential force comprises a differential drag.

8. The method according to claim 7, wherein the air vehicle comprises a drag inducing system operable for selectively providing said differential drag between said port side and said starboard side, and wherein step (B) comprises operating said drag inducing system to generate an appropriate said differential drag capable of inducing said second yaw moment in said second yaw direction.

9. The method according to claim 8, wherein the air vehicle comprises a port wing and a starboard wing, and wherein said drag inducing system is operable for selectively providing said differential drag between said port wing and said starboard wing.

10. The method according to claim 9, further comprising operating said drag inducing system wherein to cause one or another of said port wing and said starboard wing to increase drag relative to the other one of said port wing and said starboard wing to thereby generate said differential drag.

11. The method according to claim 10, wherein said drag inducing system comprises at least one of a spoiler or an air brake device on each said wing, and said increased drag is provided by at least one of:
  selectively deploying at least one of said spoiler and said air brake device on one of said port wing and said starboard wing, while selectively refraining from deploying the respective at least one of said spoiler and said air brake device on the other one of said port wing and said starboard wing; or
  selectively deploying at least one of said spoiler and said air brake device on said port wing to provide a port drag, and selectively deploying the respective at least one of said spoiler and said air brake device on said starboard wing to provide a starboard drag, wherein said port drag is of a different magnitude to said starboard drag, and wherein a difference between said port drag and said starboard drag provides said drag differential.

12. The method according to claim 11, wherein said drag inducing system comprises a respective said spoiler of each one of said port wing and said starboard wing, and wherein said spoiler is configured for enabling providing thereby said second yaw moment having a magnitude greater than a magnitude of said first yaw moment, wherein said first yaw moment corresponds to a zero rudder angle of said vertical stabilizer arrangement.

13. The method according to claim 7, wherein the air vehicle comprises a port fuselage portion and a starboard fuselage portion, and wherein said drag inducing system is operable for selectively providing said differential drag between said port fuselage portion and said starboard fuselage portion.

14. The method according to claim 5, wherein said differential force comprises a differential thrust.

15. An air vehicle, comprising:
  a vertical stabilizer arrangement, wherein said vertical stabilizer arrangement is configured to generate a first side force in a first side direction, and the first side force inducing a corresponding first yaw moment in a first yaw direction;
  an auxiliary yaw generating system configured for providing to the air vehicle a second yaw moment in a second yaw direction, said second yaw moment being induced by a force component of an auxiliary force applied to said air vehicle via said auxiliary yaw generating system, said force component being in a force direction that is non-parallel with respect to said first side direction and said force component being spaced from a center of gravity of the air vehicle; wherein said second yaw direction is opposed to said first yaw direction; and
  a controller operably coupled to said vertical stabilizer and said auxiliary yaw generating system, the controller operable to:
    direct said vertical stabilizer arrangement to generate said first side force in said first side direction, said first side force inducing said corresponding first yaw moment in said first yaw direction; and
    selectively and concurrently direct said vertical stabilizer arrangement to generate said first side force, and direct said auxiliary yaw generating system to provide said air vehicle with said second yaw moment and said force component of said auxiliary force in said second yaw direction;
    wherein a difference between said first side force and said auxiliary force providing a net side force that is non-zero that moves said air vehicle in a sideways direction.

16. The air vehicle according to claim 15, wherein said auxiliary yaw generating system is configured for generating said first yaw moment having substantially the same magnitude as said second yaw moment.

17. The air vehicle according to claim 15, wherein said auxiliary yaw generating system is configured for inducing said second yaw moment independently of at least one of:
  generating a second side force in a second side direction, wherein said second side direction is opposed to said first side direction;
  operating a pitch control surface of the air vehicle; or
  operating the vertical stabilizer arrangement.

18. The air vehicle according to claim 15, wherein said auxiliary yaw generating system is configured for generating said force component, wherein said force component comprises a differential force generated between a port side and a starboard side of the air vehicle.

19. The air vehicle according to claim 18, wherein said differential force is substantially orthogonal to a yaw axis of the air vehicle and substantially orthogonal to said first side force direction.

20. The air vehicle according to claim 18, wherein said differential force comprises a differential drag.

21. The air vehicle according to claim 20, wherein said auxiliary yaw generating system comprises a drag inducing system operable for selectively providing said differential drag between said port side and said starboard side, wherein to induce said second yaw moment in said second yaw direction.

22. The air vehicle according to claim 21, further comprising a port wing and a starboard wing, and wherein said drag inducing system is operable for selectively providing said differential drag between said port wing and said starboard wing.

23. The air vehicle according to claim 22, wherein said drag inducing system comprises at least one of a spoiler or an air brake device on each one of the port wing and the starboard wing, and said drag inducing system is configured for at least one of:
  selectively deploying at least one of said spoiler and said air brake device on one of said port wing and said starboard wing, while avoiding deploying the respective at least one of said spoiler and said air brake device on the other one of the port wing and the starboard wing; or
  selectively deploying at least one of said spoiler and said air brake device on said port wing to provide a port drag, and for deploying the respective at least one of said spoiler and said air brake device on said starboard wing to provide a starboard drag, wherein said port drag is of a different magnitude to said starboard drag, and wherein a difference between said port drag and said starboard drag provides said drag differential.

24. The air vehicle according to claim 23, wherein said drag inducing system comprises a respective said spoiler on each one of the port wing and the starboard wing, and wherein said spoiler is configured for enabling providing thereby said second yaw moment having a magnitude greater than a magnitude of said first yaw moment, wherein said first yaw moment corresponds to a zero rudder angle of said vertical stabilizer arrangement.

25. The air vehicle according to claim 20, further comprising a port fuselage portion and a starboard fuselage portion, and wherein said drag inducing system is configured for selectively providing said differential drag between said port fuselage portion and said starboard fuselage portion.

26. The air vehicle according to claim 19, wherein said differential force comprises a differential thrust.

* * * * *